US012413653B1

United States Patent
Yi

(10) Patent No.: US 12,413,653 B1
(45) Date of Patent: Sep. 9, 2025

(54) PROTOCOL DATA UNIT SYSTEMS AND METHODS

(71) Applicant: CABLE TELEVISION LABORATORIES, INC., Louisville, CO (US)

(72) Inventor: Yunjung Yi, Vienna, VA (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 18/393,532

(22) Filed: Dec. 21, 2023

Related U.S. Application Data

(63) Continuation-in-part of application No. 18/382,944, filed on Oct. 23, 2023.

(60) Provisional application No. 63/429,042, filed on Nov. 30, 2022, provisional application No. 63/423,409, filed on Nov. 7, 2022, provisional application No. 63/422,791, filed on Nov. 4, 2022, provisional application No. 63/418,280, filed on Oct. 21, 2022.

(51) Int. Cl.
*H04L 69/16* (2022.01)
*H04W 76/12* (2018.01)

(52) U.S. Cl.
CPC .......... *H04L 69/161* (2013.01); *H04W 76/12* (2018.02)

(58) Field of Classification Search
None
See application file for complete search history.

(56) References Cited

U.S. PATENT DOCUMENTS

| | | | | |
|---|---|---|---|---|
| 8,274,974 B1* | 9/2012 | Gupta | ................... | H04L 49/201 |
| | | | | 370/230.1 |
| 11,888,691 B1* | 1/2024 | Jain | ....................... | G11C 7/1036 |
| 2006/0092836 A1* | 5/2006 | Kwan | ................ | H04L 47/2466 |
| | | | | 370/389 |
| 2006/0176810 A1* | 8/2006 | Kekki | ..................... | H04W 8/04 |
| | | | | 370/229 |
| 2014/0047232 A1* | 2/2014 | Hannel | ................. | H04L 63/105 |
| | | | | 713/154 |
| 2018/0091999 A1* | 3/2018 | Zhang | ............... | H04W 28/0289 |
| 2019/0215729 A1* | 7/2019 | Oyman | .............. | H04L 65/1016 |
| 2022/0368640 A1* | 11/2022 | Wheelock | .......... | H04L 12/4633 |
| 2023/0189058 A1* | 6/2023 | Yeh | ....................... | H04W 48/18 |
| | | | | 370/329 |
| 2023/0309100 A1* | 9/2023 | Baek | ...................... | H04L 69/08 |
| 2023/0319638 A1* | 10/2023 | Kahn | ............... | H04W 28/0268 |
| | | | | 370/252 |
| 2023/0344772 A1* | 10/2023 | Johansson | ............... | H04L 47/30 |
| 2023/0354091 A1* | 11/2023 | Zhang | ............... | H04W 28/0289 |
| 2024/0388633 A1* | 11/2024 | Yu | ........................ | H04W 76/16 |

* cited by examiner

*Primary Examiner* — Fadi Haj Said
(74) *Attorney, Agent, or Firm* — Josh C. Snider; Snider IP

(57) ABSTRACT

A method of processing a protocol data unit (PDU) set for a data network includes steps of (a) receiving a first PDU packet of the PDU set, (b) receiving, subsequent to reception of the first PDU packet, a second PDU packet of the PDU set, (c) determining, after receiving the first and second PDU packets, a congestion status of the data network for the PDU set, (d) controlling, based on the determined congestion status, a handling state of the second PDU packet to match a handling state of the first PDU packet, and (e) transmitting the first PDU packet and the controlled second PDU packet to a destination receiver of the data network.

20 Claims, 10 Drawing Sheets

PROTOCOL DATA UNIT SYSTEMS AND METHODS

CROSS REFERENCE TO RELATED APPLICATIONS

This application is a continuation in part of U.S. patent application Ser. No. 18/382,944, filed Oct. 23, 2023, which prior application claims the benefit of and priority to U.S. Provisional Application No. 63/418,280, filed Oct. 21, 2022. The present application also claims the benefit of and priority to U.S. Provisional Application No. 63/422,791, filed Nov. 4, 2022, U.S. Provisional Application No. 63/423,409, filed Nov. 7, 2022, and to U.S. Provisional Application No. 63/429,042, filed Nov. 30, 2022. All of these prior applications are hereby incorporated by reference in their entireties.

BACKGROUND

The field of the invention relates generally to communication systems, and more specifically, to communication systems and methods utilizing sets of protocol data units (PDUs).

The Third Generation Partnership Project (3GPP) sets standards for mobile and cellular telecommunications technologies, including radio access, core network, and service capabilities. These standards are defined by a number of 3GPP Technical Specifications (TSs) and Technical Reports (TRs), which further provide hooks for non-radio access to the core network, and for interworking with non-3GPP networks. 3GPP technologies continue to evolve to cover further generations beyond 3G, including Fifth Generation (5G) and Long Term Evolution (LTE) networks and communications.

3GPP TS 37.340 (Releases 15-17.2.0) defines (i) PDU handover procedures for a PDU session, for both roaming and non-roaming scenarios, and with respect to both 3GPP access and non-3GPP access, and also (ii) user plane connectivity or dual connectivity for multi-RAT scenarios. PDU sets are defined in 3GPP TR 23.700-60 (e.g., through version 1.1.0), and particularly with respect to a Study on eXtended Reality (XR) and media services, as well as related XR traffic configuration techniques. Section 6.46.2.2 of 3GPP TR 23.700-60 illustrates, in FIG. 6.46.2.2-1, a 5G system utilizing Explicit Congestion Notification (ECN) marking for downlink transmissions. 3GPP TS 37.340 (Releases 15-17.2.0) defines a PDU handover procedure for a PDU session, for both roaming and non-roaming scenarios, and with respect to both 3GPP access and non-3GPP access.

These known proposals, however, do not include solutions for controlling the quality (e.g., jitter, reliability, etc.) across multiple PDU packets that may be included in an individual PDU set. For example, different PDU packets within a set may be handled differently, and thus some PDU packets within the same PDU set may arrive outside of a delay boundary for the set, and therefore be considered missing packets. In the case of missing packets, an entire PDU set may be dropped. Such problems are particularly challenging for XR applications of a data network, where a single PDU set may traverse a plurality of access networks, and where individual PDU packets of the set may originate from different networks. Accordingly, there is a need in the field to manage PDU sets such that the quality of the PDU packets contained therein may be better controlled as the PDU set traverses a data network.

SUMMARY

In an embodiment, a method of processing a protocol data unit (PDU) set for a data network includes steps of (a) receiving a first PDU packet of the PDU set, (b) receiving, subsequent to reception of the first PDU packet, a second PDU packet of the PDU set, (c) determining, after receiving the first and second PDU packets, a congestion status of the data network for the PDU set, (d) controlling, based on the determined congestion status, a handling state of the second PDU packet to match a handling state of the first PDU packet, and (e) transmitting the first PDU packet and the controlled second PDU packet to a destination receiver of the data network.

In an embodiment, a method of processing a protocol data unit (PDU) set for a data network includes steps of (a) receiving a first PDU packet of the PDU set (b) receiving, subsequent to reception of the first PDU packet, a second PDU packet of the PDU set, (c) identifying that the first PDU packet is the first PDU packet of the PDU set in time, (d) determining a congestion status for the PDU set based on the received first PDU packet, (e) controlling, based on the determined congestion status, a handling state of the second PDU packet to match a handling state of the first PDU packet, and (f) transmitting the first PDU packet and the controlled second PDU packet to a destination receiver of the data network.

In an embodiment, an access node is provided for a data network. The access node includes a processor and a memory having computer-executable instructions stored therein. When executed by the processor, the instructions cause the access node to (a) receive (i) a first protocol data unit (PDU) packet of a first PDU set, and (ii) a second PDU packet of the first PDU set subsequent to reception of the first PDU packet, (b) establish a distinct PDU session for the first PDU set, (c) determine a congestion status of the data network for the PDU set, (d) control, based on the determined congestion status, a handling state of the second PDU packet to match a handling state of the first PDU packet, and (e) transmit the first PDU packet and the controlled second PDU packet to a destination receiver of the data network.

BRIEF DESCRIPTION

These and other features, aspects, and advantages of the present disclosure will become better understood when the following detailed description is read with reference to the following accompanying drawings, in which like characters represent like parts throughout the drawings.

Figure 1:
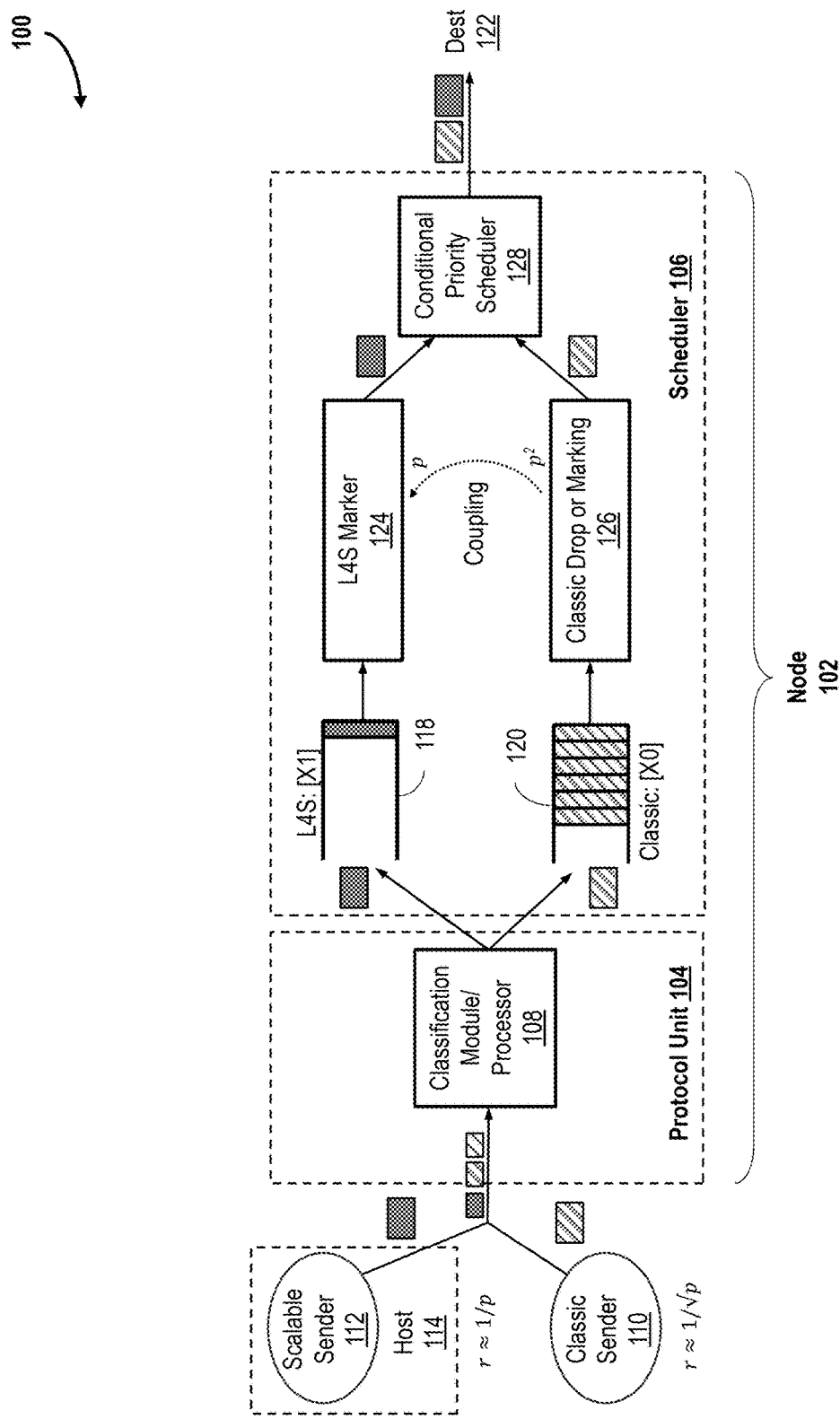
FIG. 1 is a schematic illustration depicting an exemplary packet data unit scheduling system, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but are not limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

As described herein, "user equipment," or UE, refers to an electronic device or system utilizing a wireless technology protocol, such as Long Term Evolution (LTE) or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) and physical layer (PHY) interface, both of which may be 802.11-conformant and/or 802.16-conformant to a wireless medium (WM).

As used herein, a "Non-3GPP," or N3GPP, device is a device that utilizes non-3GPP access technology to connect to a residential gateway (RG), and which does not support the Non Access Stratum (NAS) over the N3GPP access. In contrast, an "Authenticable Non-3GPP," or AUN3, device is a Non-3GPP device that the 5G core network is able to authenticate, whereas a "Non-Authenticable Non-3GPP," or NAUN3, device is a Non-3GPP device that cannot be authenticated by the 5G core network.

As used herein, unless specified to the contrary, "modem termination system," or "MTS" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

Unless otherwise described to the contrary herein, element and device terminology, including the respective functionalities thereof, should be considered to have substantially similar structure and functionality with components given the same labels in the respective 3GPP TSs and/or TRs cited above. Nevertheless, any term defined differently within the present written description, or which may be describes as having additional or different functionality, should be considered to take precedence over the definition of the same term in these other 3GPP TSs and/or TRs.

PDU Set Handling

The innovative systems and methods described herein provide unique solutions to PDU handling over one or more data networks. The present embodiments leverage PDU management techniques, along with conventional Active Queue Management (AQM) techniques, to provide unique capabilities for controlling the quality (e.g., priority, path, handling, etc.) of all packets in a PDU set to prevent the loss of PDU sets due to different handling of individual packets within the PDU set.

For example, in the case of edge computing, i.e., where multiple data networks may provide a plurality of various PDU packets, conventional mechanisms allow a PDU set to include a first PDU packet from a first data network, and a second PDU packet from a different, second data network. Using such conventional mechanisms, high delay jitter may occur between the first PDU packet and the second PDU packet due to the different packet protocols used by the two networks, thereby resulting in varying reliability results between the first PDU packet and the second PDU packet. Such results present particular challenges in the case where the data network is considered for an XR application.

That is, a PDU set for an XR application may include one or more PDU packets having some interdependency among the set. For example, a single PDU set may include one or more audio frames and one or more video frames, where the respective audio and video frames may correspond to a same scene or a video clip. Accordingly, the quality of services (QoS) across the multiple PDU packets should be delivered such that the latencies of the multiple packets are maintained with low jitter. The reliability of the multiple packets should therefore be consistent to avoid possible drop of the entire PDU set due to one packet of the PDU set failing to meet the reliability needs of the PDU set (e.g., arriving outside of the delay boundary).

Some conventional techniques use packet switching mechanisms for traffic splitting and switching, including Active Queue Management (AQM). Multiple innovative AQM techniques are described in greater detail in U.S. Pat. No. 10,944,684 to the present Assignee, the subject matter thereof which is incorporated by reference herein in its entirety. This prior patent describes a variety of AQM techniques for traffic flow over a network, including without limitation, Proportional Integral Controller Enhanced (PIE), Controlled Delay (CoDel), Fair/Flow Queueing+CoDel ("fq_codel" variant), Bottleneck Bandwidth and Round trip time (BBR), Low Latency Low Loss Scalable throughput (L4S), Dual Queue (DualQ), Prague Transmission Control Protocol (TCP-Prague), congestion exposure (ConEx), Data Center TCP (DCTCP), and Accurate ECN. For ease of explanation, the following embodiments are described with respect to DualQ and L4S techniques for PDU set handling. The person of ordinary skill in the art though, will understand that these examples are provided by way of illustration, and are not intended to be limiting.

However, conventional DualQ mechanisms do not provide means to control the quality (e.g., jitter, reliability, etc.) across the several PDU packets of the PDU set across a plurality of access networks. For example, multiple PDU packets may be delivered over a plurality of access networks (a) using dual connectivity or multi-connectivity, and/or (b) by way of 3GPP access and non-3GPP access, e.g., based on Access Traffic Steering Switching and Splitting (ATSSS). These delivery systems though, are not configured to control the quality of packets in the same PDU set that arrive from different networks.

Similar challenges arise with respect to the L4S paradigm. Conventional L4S Internet Service techniques adapt the data rate of packets based on network congestion that occurs at access networks, such as new radio (NR, 5G), wireline, and/or wireless LAN. In the access paradigm, congestion across the data network may be determined by an access node (e.g., a base station, an NG-RAN, an N3IWF gateway, a wireline gateway, an access gateway, a wireline access node, a modem termination system (MTS) or cable MTS (CMTS), a modem or cable modem (CM), an optical network terminal (ONT), an optical line terminal (OLT), and the like). The processor of the respective node may then, using the ECN protocol, set an ECN-capable Transport (ECT) congestion flag in an IP header based on the determined congestion.

However, for a PDU set, a first packet of a PDU set may be set with one congestion flag (e.g., (e.g., ECT(1), indicating congestion), whereas a second packet of the PDU set may not indicate congestion (e.g., set with ETC(0)). In this scenario, the first packet may be delivered very quickly relative to the second packet, thereby resulting in a significantly different quality of experience from this difference, such as possible delay or jitter between the first and second packets, where the second packet may exceed the required latency/jitter of the PDU set. In this case, the node may drop the entire PDU set, including the first packet, leading to significant performance degradation. The following embodiments provide innovative solutions to overcome this problem, yielding significant improvements to the L4S framework for PDU set handling.

In an exemplary embodiment, PDU set handling is improved by enhancing one type of PDU packet handling technology (e.g., DualQ, dual connectivity, carrier aggregation, etc.) with a congestion control mechanism of another technology (e.g., L4S) to greatly enhance the quality of experience and mitigate the risk of dropping entire PDU sets. A PDU set, for example, includes a plurality of IP packets and/or PDU packets, and the packet forwarding policies of one network may not be the same as the policies of another network that may add packets to, or forward, the PDU set. These differences in packet handling may result in the particular per-packet policy/QoS/queueing for one packet in the PDU set being different than for other packets in the same PDU set. The following embodiments thus demonstrate how particular principles from different technologies may be utilized together to enable a node to enable all packets within the same PDU set to have substantially the same handling, reliability, latency, and quality.

FIG. 1 is a schematic illustration depicting an exemplary PDU scheduling system 100. System 100 includes a node 102, which may, for example, represent one or more of a base station, a gateway, a router, an access node, an OLT, an ONT, a MTS/CMTS, a modem/CM, a broadband network gateway, a Wi-Fi AP, an N3IWF, a TNGF, a W-AGF, an AGF, a processor enabled for network function (e.g., user plane function (UPF)), and/or similar devices, servers, or components having traffic delivery capabilities. In an exemplary embodiment, node 102 includes a protocol unit 104 and a traffic or network scheduler 106. In some embodiments, protocol unit 104 and scheduler 106 are contained within the same node 102. In other embodiments, protocol unit 104 and a scheduler 106 may be distributed across multiple nodes 102.

In the exemplary embodiment depicted in FIG. 1, protocol unit 104 is configured with scheduling functionality, and includes a classification module 108 that is configured to track the received upstream traffic and classify service flows (e.g., as active and/or inactive). In some embodiments, classification module 108 may be configured to estimate bandwidth demand for active service flows from, for example, a classic sender 110 and a scalable sender 112, e.g., of a host 114. Scheduler 106 may then proactively schedule the bandwidth, and/or other protocol resources, according to the estimated demand. Either or both of classic sender 110 and scalable sender 112 may, for example, be or represent one or more of an application, and end device, and a server configured to send data packets at a packet rate r. In the exemplary embodiment, each of protocol unit 104, scheduler 106, and classification module 108 may include, or utilize, one or more processors (not separately shown) to implement one or more algorithms according to the techniques described herein.

In operation of system 100, classification module 108 may be further configured to separate the traffic from scalable sender 112 into a first traffic queue 118, and from classic sender into a second traffic queue 120. In the exemplary embodiment depicted in FIG. 1, first traffic queue 118 is dedicated to sending a low latency, high-priority (e.g., L4S ([X1]), in this example) service flow, e.g., where the packet rate r is inversely proportional to a packet drop/mark probability p, and second traffic queue 120 is dedicated to sending a lower-priority (e.g., classic ([X0]), in this example) service flow, e.g., where r≈1/√p. That is, classification module 108 may be advantageously configured to implement both L4S and DualQ AQM functionality to prioritize traffic from senders 110, 112 differently.

In conventional systems, however, where a single PDU set intended for a destination 122 may contain packets having different classification priorities, the risk of dropping the entire set increases when one or more of the lower priority packets is dropped or falls outside of a delay boundary. Destination 122 may, for example, represent a master cell group (MCG) and/or a secondary cell group (SCG) (not separately shown). In the case where destination 122 includes both of an MCG and an SCG, the MCG may represent a first access network, and the SCG will then represent a different, second access network. In such a scenario, node 102 of system 100 may therefore represent one or more bearers configured to support a PDU session with a PDU set enabled for delivery to only one of the first and second access networks for each individual PDU set.

According to this example, a first PDU set of a PDU session may be delivered to one access network (e.g., the MCG/first access network), and a second PDU set of the PDU session may be delivered to another (e.g., the SCG/second access network). Thereafter, the MCG or the SCG may determine where to transmit each PDU set when the one or more bearers of a PDU set is configured across the MCG and the SCG. In the case of a bearer of an XR application, i.e., when a PDU set is enabled, a base station (e.g., of the MCG or SCG) or Service Management and Orchestration element (SMO, e.g., for 5G) may determine that that the PDU session of the XR application is configured for only one of the access network cell groups (e.g., the MCG or the SCG) for a wireless device (not shown) of the XR application that is established with the MCG and SCG.

In this scenario, the wireless device may be configured to indicate whether the wireless device is established with a dual connectivity or multi-access connectivity during a PDU session for the XR application. Conventionally, the one or more bearers of the PDU session may be established by way of the MCG or the SCG, but may not be enabled with a split bearer across both of the MCG and SCG. For example, a base station or NG-RAN may not configure or allocate a split bearer for a PDU session if the PDU session is for an XR application, if the PDU session is configured with a PDU set capability, and/or the PDU session is enabled with functionality related to a PDU set/XR functionalities.

Alternatively, the wireless device may indicate, or provide assistance information on, a desired bearer type for the PDU session or the XR application. That is, the wireless device may indicate a preference an MCG bearer, an SCG bearer, or a split bearer. Furthermore, the wireless device additionally, optionally, and/or separately may indicate one or more serving cells where the wireless device prefers to receive data of the PDU session, data of the XR application, or for a XR application layer. For the purposes of these examples, a multi-cell group is defined as including multiple cell groups (e.g., including at least the MCG and SCG), and may be implemented for a plurality of respective serving cells. For example, a first serving cell may follow the MCG, whereas a second serving cell may follow the SCG.

Where a split bearer is configured for the PDU session enabled with a PDU set, the node/base station may transmit to, or forward from, the wireless device the respective data from, or to, a data network from individual units of the PDU set. For example, one or more packets or PDUs belonging to a same PDU set may be delivered by way of the same cell group (e.g., the MCG or SCG), a same serving cell, a same numerology, a same bearer, and/or a same bandwidth part, etc. In the case of a split bearer configured for the PDU session enabled with a PDU set, and also for an XR application/PDU set (e.g., also applicable for another bearer type), the wireless device may additionally or alternatively transfer delay information (e.g., of the PDU session or the bearer) from each cell group of the multi-cell group.

For example, a wireless device may indicate or transmit one or more buffer status reports (BSRs), measurement reports, and/or Radio Resource Control (RRC) messages (e.g., for 5G). The wireless device may thus piggyback a first delay and/or jitter information of the MCG and a second delay and/or jitter information of the SCG. In some cases, the wireless device piggybacks the first delay and the second delay in the same message/report (i.e., belonging to the respective BSRs, measurement reports, and/or RRC messages). In other cases, the wireless device piggybacks the first delay in a separate message/report from the second delay.

In at least one embodiment, the PDU set of the PDU session may be delivered to a serving cell when the wireless device is configured and/or activated with a plurality of the serving cells. For example, a base station of a particular serving cell may schedule resources of a first PDU set of the PDU session by way of a first serving cell, and resources of a second PDU set of the PDU session by way of a different second serving cell.

In the exemplary embodiment depicted in FIG. 1, system 100 is further configured for L4S functionality, such that a PDU session of a XR application may be enabled with a L4S architecture/framework. In exemplary operation of system 100, node 102 (e.g., a base station) processes the PDU session, and scheduler 106 further includes an L4S marking unit 124 supporting ECN tagging of traffic queue 118, e.g., using an IP header and/or queueing mechanism (DualQ, in this example) to support low latency traffic of second traffic queue 120 with or without congestion.

In further exemplary operation of system 100, an L4S-enabled application may indicate ECT(0) in the IP header of a PDU packet, which indicates that the particular PDU packet is to be delivered enabled with L4S priority. In this example, L4S marking unit 124 is further configured to, upon congestion detection (e.g., by the base station, network function, or user plane function (UPF) of node 102, in responding to detecting a congestion, for the PDU packet with ECT(0), may set or change a value of the packet's ECN field from ECT(0) to ETC(1) (or from ECT(00) to ETC(01)), thereby indicating that a congestion occurs for the PDU packet.

In an exemplary embodiment, scheduler 106 further includes a classic drop/marking unit 126 coupled with L4S marking unit 124, as well as a conditional priority scheduling unit 128 (e.g., for a base station, UPF, etc.). Thus, upon congestion occurrence for the PDU packet, conditional priority scheduling unit 128 may be configured to dynamically change the scheduling/queuing of the PDU packet when congestion occurs, e.g., by adapting a priority value of the PDU packet, and/or sending the PDU packet to the L4S queue (e.g., first traffic queue 118), In at least one embodiment, conditional priority scheduling unit 128 may additionally, or alternatively, adapt QoS parameters of the PDU packet to the changing conditions (e.g., detected congestion).

For ease of explanation, the preceding description of system 100 addresses the dynamic packet handling capabilities of the present embodiments with respect to a single PDU packet and some conditions detected therefor. Handling of all packets in an entire PDU set is described further below with respect to FIG. 2.

Figure 2:
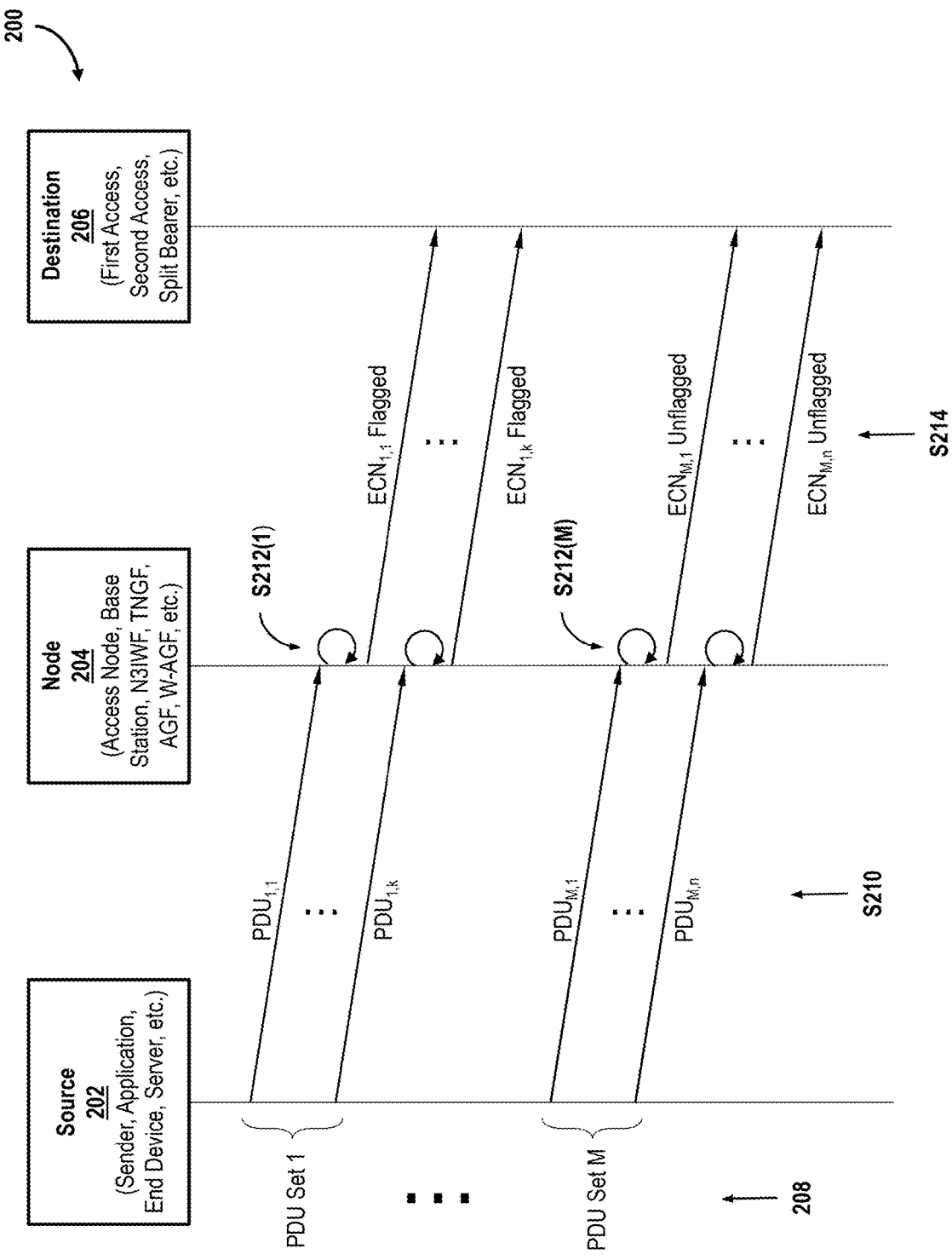
FIG. 2 is a sequence flow diagram depicting an exemplary packet data unit flagging process, in accordance with an embodiment.

FIG. 2 is a sequence flow diagram depicting an exemplary PDU flagging process 200. In an exemplary embodiment, process 200 is executed among and with respect to a source 202 (e.g., senders 110, 112, FIG. 1), a node 204 (e.g., node 102, FIG. 1), a destination 206 (e.g., destination 122, FIG. 1), and at least one PDU set 208 (i.e., 1-M PDU sets 208) from source 202 for a distinct respective PDU session. Unless described below to the contrary, one or more of the several steps, subprocesses, and/or subroutines of process 200 may be performed in a different order, and/or two or more of the several steps/subprocesses/subroutines may be performed simultaneously.

In exemplary operation, process 200 begins at step S210, in which node 204 receives a first PDU of a particular PDU set 208 from source 202. In step S212, node 204 determines the respective protocol and/or priority for the received first PDU (e.g., by classification module 108, FIG. 1) and flags the received PDU accordingly. In an exemplary embodiment of step S212, node 204 executes at least one AQM technique on the received first PDU based on a classification, protocol, and/or desired quality of the entire particular PDU set 208. In some embodiments of step S212, node 204 (a) determines/sets the ECN bit (e.g., when L4S-enabled), and/or (b) determines the queue selection (e.g., when DualQ-enabled), of the first received PDU. In step S214, node 204 sends the flagged PDU to its intended destination 206 according to the priority or other parameters indicated by the flag set in step S212.

According to the innovative techniques of process 200, steps S210 through S214 are then repeated for each subsequent PDU of the particular PDU set 208 until all PDUs in that PDU set 208 have been processed, flagged, and sent to destination 206. In contrast to conventional techniques though, once node 204 has flagged the first PDU in a particular PDU set 208, all subsequent PDUs of that PDU set 208 will be processed/flagged the same as the first PDU so that the handling of all PDUs in the same set will steered, prioritized, and/or managed the same to mitigate the possibility of dropping an entire PDU set due to one individual PDU being handled differently than the others, such as in the case where one PDU falls outside of the delay boundary.

In the exemplary embodiment depicted in FIG. 2, process 200 is illustrated as operating with respect to a plurality of M PDU sets 208 (i.e., 1-M PDU sets 208, in this example). A first PDU set 208(1) of the M PDU sets 208 is shown to include a plurality k of PDUs (i.e., 1-k PDUs), whereas the Mth PDU set 208(M) is shown to include a plurality n of PDUs (i.e., 1-n PDUs). Accordingly, for this example, node 204 determines that the first PDU of first PDU set 208(1) (i.e., $PDU_{1,1}$) is to be flagged as higher priority, and in step 212(1), sets the ECN bit accordingly. Thereafter, the respective ECN bit of each subsequent PDU of first PDU set 208(1) is flagged the same, until the last PDU of first PDU set 208(1) (i.e., $PDU_{1,k}$) is processed and sent to destination 206.

Further to this example, for illustration purposes, process 200 is depicted to manage Mth PDU set 208(M) similarly, but with the determination by node 204 that PDU set 208(M) is to be handled with lower priority for the entire set. Accordingly, the first PDU of Mth PDU set 208(M) (i.e., $PDU_{M,1}$) is to be flagged as lower priority, or unflagged, in the case where $PDU_{M,1}$ may have originally been flagged as higher priority (or received from an L4S queue). Thereafter, steps S210 through S214 of process 200 are then repeated until the last PDU of Mth PDU set 208(M) (i.e., $PDU_{M,n}$) is processed and sent to destination 206. For this example, since node 204 determines that Mth PDU set 208(M) need not be delivered with high priority, every PDU of Mth PDU set 208(M) is unflagged to prevent potential higher-priority PDUs of the set from arriving too far in advance of the other PDUs in the set.

In an exemplary implementation of process 200, a PDU session of an XR application includes the plurality M of PDU sets 208, each having a respective plurality (e.g., k, n, etc.) of PDU packets. A base station or UPF of node 204 receives, at a first time, a first packet or PDU (e.g., $PDU_{1,1}$, $PDU_{M,1}$) of a PDU set 208 (e.g., PDU set 208(1), 208(M)), and a second packet or PDU of that PDU set 208 at second time subsequent to the first time. At the first time, node 204 (or base station or UPF thereof) may not detect congestion when the first packet/PDU is received. However, node 204 may detect/determine a congestion at the second time when the second packet/PDU is received, or at time between the first and second times. In the case where node 204 did not set ECT(1) for the first packet/PDU, node 204 will not change the ECN bit field of the IP header of the second packet/PDU of that PDU set 208, even upon the later congestion detection/determination after receiving the first packet/PDU, but before all packets/PDUs of that PDU set 208 are received, processed, and delivered.

According to this exemplary implementation of process 200, a different result is achieved in comparison with conventional techniques. That is, whereas a conventional data traffic management system would be expected, once the congestion is detected after reception of the first packet/PDU (i.e., after the first time), to change the ECN bit of subsequent packets/PDUs of that PDU set 208 from ECT(0) to ECT(1), the ECN bit of the subsequent packets does not change according to process 200.

In an alternative implementation, node 204 may detect/determine a congestion occurrence at or prior to the first time, when the first starting packet/PDU of the particular PDU set is received by node 204. In this scenario, node 204 may set the ECN bit for the first packet/PDU to ECT(1), or change the ECN bit from ECT(0) to ECT(1) if the ECN bit had already been set by the sender. Thereafter, node 204 may then advantageously manage all of the ECN bits of subsequent packets/PDUs of that PDU set 208 such that all such respective subsequent ECN bits remain, or are changed to, ECT(1). In an exemplary embodiment, node 204 is configured to update a congestion status for a following, second PDU set 208(2) once the last packet/PDU of the first PDU set 208(1) has been processed as described above. According to conventional techniques, the congestion status may update within the processing time of a single PDU set, thereby increasing the risk that the entire set may be dropped.

In at least one exemplary implementation, node 204 may determine a congestion status at the time an ending (or latest) packet/PDU of a PDU set 208 (e.g., PDU set 208(1)) is received. In this case, node 204 may be further configured to utilize this congestion detection/determination for the immediately following subsequent PDU set 208 (e.g., PUD set 208(2)), and set the respective ECN bit of the first packet/PDU of the immediately following set to ECT(1). More particularly, in this example, node 204 sets the congestion status (i.e., the ECN bit) for a first packet/PDU of a second PDU set 208(2) based on a last packet/PDU of an immediately-preceding first PDU set 208(1). Accordingly, node 204 may set the ECN bit to ECT(1) for all of the respective packets/PDUs of the second PDU set 208(2). According to this exemplary implementation, subsequent PDU sets 208(2-M) may be advantageously handled in a more timely and efficient manner.

In an exemplary embodiment, the scheduler of an access node (e.g., conditional priority scheduling unit 128, FIG. 1) may be further configured to send one or more packets of a PDU set to a same queue between an L4S-enabled queue (e.g., first traffic queue 118, FIG. 1) and a non-L4S-enabled (e.g., DualQ-enabled) queue (e.g., second traffic queue 120, FIG. 1), irrespective of the ECN field of a particular packet/PDU. For example, a queue for a given PDU set may be determined based on an earliest, first, initial, or starting packet/PDU of that PDU set. Alternatively, the queue of a following second PDU set may be determined based on a last, latest, of ending packet/PDU of a first PDU set preceding the second PDU set. In this alternative scenario, it is presumed that the first PDU set occurs before the second PDU set, and that no other packets/PDUs are received by the access node between the last packet/PDU of the first PDU set and the first packet/PDU of the second PDU set. These innovative queue determination techniques are thus of particularly advantageous utility in the case of XR applications for multiple PDU sets where individual packets/PDUs thereof may arrive from a variety of different sources.

XR Over Non-3GPP Access

As described above, conventional 5G network/5G core support for XR applications requires tight coordination/support from the NG-RAN, the base station supporting new radio (NR) or LTE, the RAN supporting 5GC support, and/or the 3GPP access. For example, the required congestion information/level from a base station may be exposed to an XR application, and the XR application may then adapt its rate based on the congestion. 3GPP TS 23.501 (Releases 15-17.5.0) defines some such relevant 5G System User Plane Protocol Stacks and Non-3GPP Access Networks supporting XR applications.

Conventionally, the 3GPP access base station or NG-RAN may serve as the entity that exposes congestion level to one or more XR applications. However, when a wireless device conventionally connects to the 5GC by non-3GPP access means (e.g., wireline, cable, fiber, WLAN, Wi-Fi, etc.), the XR application may not be able to utilize the congestion information to adapt, since the non-3GPP access means will not typically expose such congestion information to the XR application. Thus, conventionally, the QoS through non-3GPP access may be significantly degraded in comparison to the QoS realized through 3GPP access. Since most indoor connections utilizing XR applications are typically based on non-3GPP access, conventional techniques experience significantly less efficient use of resources, as well as lower quality, for non-3GPP XR applications in comparison with 3GPP XR applications. This challenge is overcome according to the following solutions.

ECN Tagging on an Access Network

In an exemplary embodiment, an XR application enables tagging, at an access node, of a congestion indicator/indication level. In some embodiments, the tagging may be enabled by an L4S-enabled transport session and/or an L4S-enabled IP session. As described above, an access node may include an MTS, a CMTS, an AGF, non-3GPP interworking function (N3IWF), a trusted non-3GPP gateway function (TNGF) for non-3GPP access, a broadband network gateway, an optical link terminal, an optical link controller, a modem, a cable modem, etc. The person of ordinary skill in the art will understand that such access nodes for ECN tagging are described by way of example, and are not intended to be limiting.

In an exemplary embodiment, in the case of an N3IWF, a wireless device may establish an Internet Protocol Security (IPsec) tunnel to the N3IWF. In this scenario, an XR PDU packet, such as an IP packet, may be delivered from an XR application to a UPF in an [IP header][PDU payload] format, and the UPF may then deliver the received PDU packet to the N3IWF. At the N3IWF, an outer IP header may be added to, and security encryption performed on, the received XR PDU packet. For example, the N3IWF may encrypt the [IP header][PDU payload] of the XR PDU, and then add an [outer IP header]. The XR PDU packet thus takes the form, at the N3IWF, of [outer IP header][IP header][PDU payload].

In an exemplary embodiment, in the case of L4S, an IP header may include an ECN field, which may ECN field may indicate no ECT, ECT(0), ECT(1), or CE (congestion experienced), for example, as described in Internet Engineering Task Force (IETF) Request for Comments (RFC) 8356 and/or IETF RFC 3168. For example, ECT(0) will indicate no L4S support, whereas ECT(1) will indicate L4S support. Additionally, when ETC(1) is indicated in an IP header, the node/access node setting the congestion may change the ECN field to CE. Accordingly, when the XR application supports L4S, and the IP header includes a first ECN field indicating ECT(1), the N3IWF or TNGF creating/adding the outer IP header may copy the first ECN field from the IP header to a separate second ECN field of the outer IP header.

According to this embodiment, when an access node receives the second ECN field indicating ETC(1) and detects congestion, the receiving access node may set the second ECN field to CE to indicate the detected congestion. Therefore, when a wireless device subsequently receives the XR PDU packet that includes the second ECN field indicating CE, the wireless device may then copy this second ECN field (e.g., from the outer IP header) to the first ECN field of the IP header, such that an application layer of the wireless device may then determine the network congestion.

In an exemplary embodiment, an IPSec tunnel between the wireless device and the N3IWF/TNGF may then be supported for both the downlink and the uplink. For example, in the case of a downlink PDU packet: (a) the N3IWF/TNGF may copy the first ECN field of the IP header to the second ECN field of the outer IP header when the N3IWF/TNGF adds the outer IP header; and (b) the wireless device may copy the second ECN field of the outer IP header to the first ECN field of the IP header when the wireless device receives the downlink PDU packet with the outer IP header.

In the case of an uplink PDU packet: (a) the wireless device (i) receives a PDU packet with an IP header, (ii) creates an outer P header for the received PDU packet, and (iii) copies the first ECN field of the received IP header to the second ECN field of the created outer IP header; (b) the access node may then set the second ECN field of the outer IP header to CE; and (c) the N3IWF/TNGF may (i) remove the outer IP header from the uplink PDU packet, but (ii) copy the second ECN field of the outer IP header to the first ECN field of the IP header before forwarding to a UPF.

Figure 3:
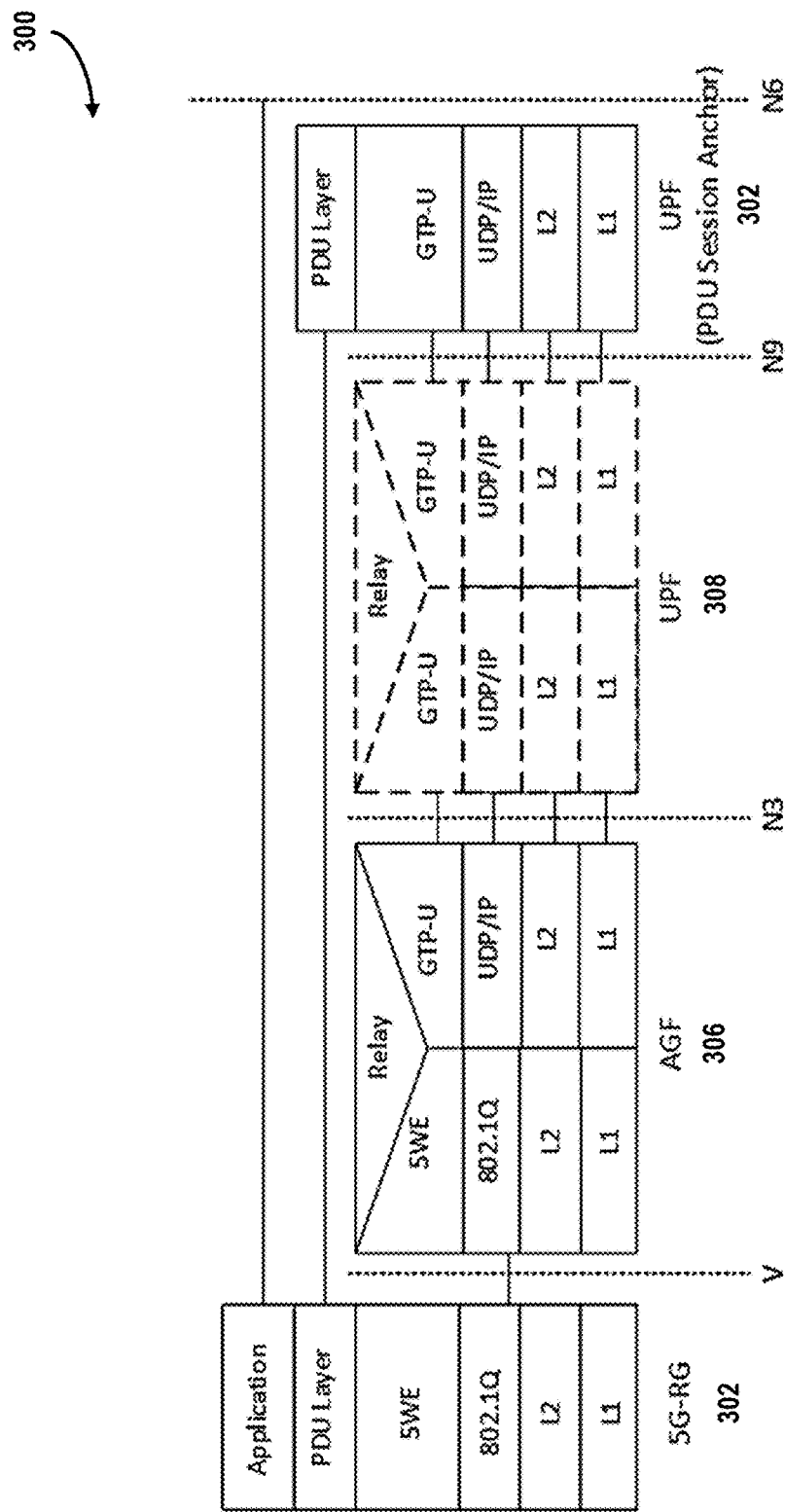
FIG. 3 is a schematic illustration depicting an exemplary user plane stack, in accordance with an embodiment.

FIG. 3 is a schematic illustration depicting an exemplary user plane stack 300. In the exemplary embodiment depicted in FIG. 3, user plane stack 300 is depicted as a logical architecture between a 5G-RG 302 and a first UPF 304 serving as a PDU session anchor. In the exemplary embodiment, an AGF 306 is disposed between 5G-RG 302 and first UPF 304. In some embodiments, a second UPF 308 may be logically disposed between AGF 306 and first UPF 304. Internal layers, relays, and structural configurations of 5G-RG 302, first UPF 304, AGF 306, and/or second UPF 308 may, for example, be according to one or more of the 3GPP TSs/TRs described above.

Accordingly, in the case of wireline connection to a 5GC for an XR application, several approaches are supported for a 5G system utilizing user plane stack 300. For example, in a first exemplary approach, a device behind a residential gateway (RG) running an XR application may connect to 5G-RG 302, but the XR application may be transmitted by way of a non-5G/non-3GPP system. In this case, 5G-RG 302 may schedule or transmit traffic from the first device using the wireline infrastructure or Internet without needing to go through 5G system.

In a second exemplary approach, a device behind an RG may support 5G NAS signaling and/or PDU session procedures, and thus connect to the 5G system using trusted or untrusted non-3GPP access. For example, the second device may establish a connection to an N3IWF using wireline access, namely to the wireline of 5G-RG 302 access node, through AGF 306 and first UPF 302 (and optionally second UPF 308), to the N3IWF for untrusted access (or to a TNGF using the wireline access for trusted access).

In a third exemplary approach, a device behind an RG may be authenticated by a 5G system in the case where the device may not support 5G NAS signaling and/or PDU session procedures. In this case, an XR application may run on the device, and a transport layer of the XR application may enable L4S. Alternatively, the device may run the XR application, but the transport layer of the XR application may not be enabling for L4S.

In a fourth exemplary approach, a device behind an RG may not be authenticable by a 5G system (e.g., not identifiable) in the case where the device does not support 5G NAS signaling and/or PUD session procedures. In this case, similar to the third exemplary approach, the XR application may run on the device, and a transport layer of the XR application may enable L4S. Alternatively, the device may run the XR application, but the transport layer of the XR application may not support or be enabling for L4S.

Figure 4:
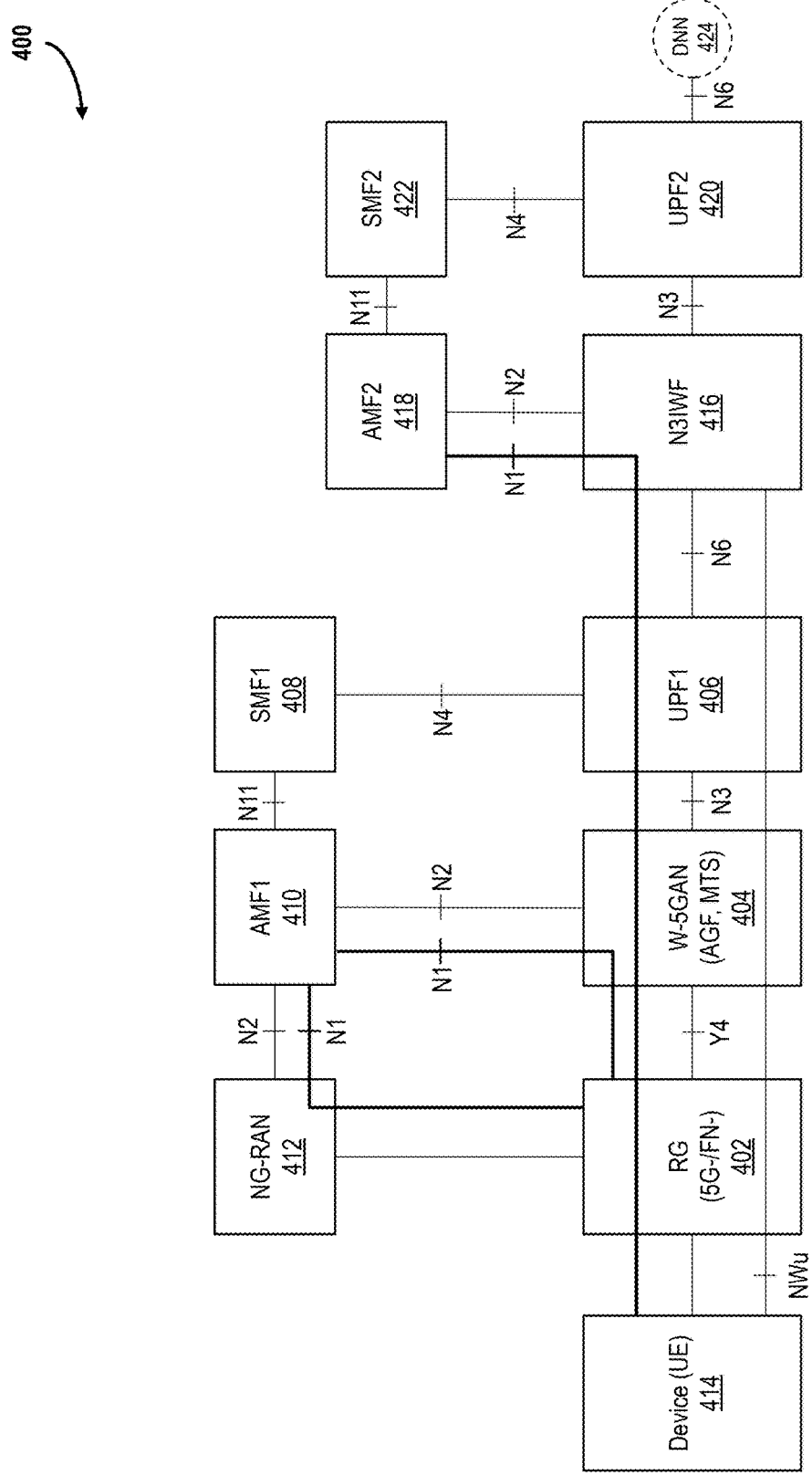
FIG. 4 is a schematic illustration depicting an exemplary communication network architecture, in accordance with an embodiment.

FIG. 4 is a schematic illustration depicting an exemplary communication network architecture 400. In the exemplary embodiment depicted in FIG. 4, architecture 100 includes a gateway/RG 402 (e.g., a 5G-RG, fixed network RG (FN-RG), etc.) in operable communication (e.g., over a Y4 interface) with a Wireline 5G Access Network (W-5GAN) 404. W-5GAN 404 may, for example, include a wireline AGF (e.g., W-AGF) and/or an MTS, and is further in operable communication (e.g., over an N3 interface) with a with a first UPF 406. First UPF 406 is in operable communication (e.g., over an N4 interface) with a first session management function (SMF) 408, and first SMF 408 is further in operable communication (e.g., over an N11 interface) with a first access and mobility management function (AMF) 410, which may be part of, or in further communication with, a 5GC (not shown in FIG. 4).

In an embodiment, first AMF 112 may be further in operable communication with W-5GAN 404 (e.g., over an N2 interface), as well as one or more of an authentication server function (AUSF), a unified data management (UDM), and a unified data repository (UDR) (not shown in FIG. 4). In the exemplary embodiment, architecture 400 further includes an NG-RAN 412 in operable communication with both of RG 402 (e.g., over an air interface, a unique user (UU) interface, etc.), as well as with first AMF 410 (e.g., over an N2 interface). In some embodiments, RG 402 may be further enabled to communicate with first AMF 410 over an N1 interface through either of NG-RAN 412 or W-5GAN 404. In exemplary operation, at least one communication device 414 (e.g., a UE) connects with RG 402.

In further exemplary operation, architecture 400 further includes an N3IWF (or TNGF) 416 in communication with a second AMF 418 (e.g., over an N2 interface) and a second UPF 420 (e.g., over an N3 interface). In an embodiment, architecture may further include a second SMF 422 in operable communication with second AMF 418 (e.g., over an N11 interface) and second UPF 420 (e.g., over an N4 interface). In this embodiment, device 414 may additionally communicate with N3IWF 416 (such as NWu, through RG 402, W-5GAN 404, and first UPF 406) and second AMF 418 (e.g., over an N1 interface through N3IWF 416). In at least one embodiment, second UPF may communicate with an external deep neural network (DNN) 424 for UEs (e.g., over an N6 interface).

Using exemplary architecture 400, different types of devices may realize different and adaptable performance of L4S handling and/or congestion marking. For example, in a first exemplary approach, W-5GAN 404 includes an MTS and an AGF. Thus, when a new IP header is created (e.g., in the AGF of W-5GAN 404 and/or first UPF 406), the ECN field of an existing IP header may be copied, and/or, in the case where an IP header is removed, the ECN field of the IP header may be copied to an inner IP header, if any.

Desired information from a GPRS Tunneling Protocol (GTP) of the user plane (GTP-U) (e.g., from AGF of W-5GAN 404, AGF 306, FIG. 3; from first UPF 406, second UPF 308, FIG. 3) may be extracted and inserted to an IP header in each hop thereof. In the case where first UPF 406 (e.g., of a wireline access) does not support L4S, but second UPF 420 does support L4S, the traffic for device 414 would not be supported with L4S. However, L4S may be enabled for an XR application of device 414 if supported by the relevant wireline access, as well as a PDU session anchor (PSA) or 5G core connected to external DNN 424.

In this exemplary approach, N3IWF 416 for device 414 (e.g., UE) may be based on either a service level agreement or signaling to indicate whether the relevant wireline access supports L4S. For example, a first policy for the wireline access may enable L4S for a PDU session or a data session, and a second policy for an overlay PDU session corresponding to the underlying PDU session/data session may be enabled with L4S. In the reverse example, similar policies may be implemented for disabling L4S. Thus, when device 414 establishes a PDU session in using the wireline network, a policy control function (PCF) of the network may determine policy charging and control (PCC) rules based on device subscription information and local configuration, which consider the respective service level agreement, and then install the PCC rules on first SMF 408 to generate and install a packet detection rule (PDR) or usage reporting rule (URR) on first UPF 406.

In a second exemplary approach, RG 402 establishes a PDU session for device 414. Device 414 may then inform RG 402 as to whether L4S for the established PDU session is enabled, and RG 402 may inspect corresponding data from device 414 to verify whether L4S is enabled. In the case where L4S is enabled, RG 402 may set the ENC field to ECT(1) and enable L4S based on the configuration and/or policy from 5G core upon establishment of the PDU session. That is, the 5G system may further indicate whether the established PDU session should be supported with L4S.

In a third exemplary approach, RG 402 establishes a PDU session for device 414, and device 414 informs RG 402 whether L4S is enabled for device 414. Similar to the second exemplary approach, RG 402 may then verify whether L4S is enabled as informed. In the case where L4S is enabled, RG 402 may set the ENC field to ECT(1) and enable L4S based on the configuration and/or policy from 5G core upon establishment of the PDU session, again similar to the second exemplary approach.

In a fourth exemplary approach, RG 402 establishes a PDU session for device 414, and further runs a transport protocol for enabling L4S. The relevant ECN field(s) may then be set according to one or more of the examples described above.

Congestion Level Exposure on a Non-3GPP Access Network

In an exemplary embodiment, for ECN marking performed at a UPF (e.g., first UPF 406) or PSA, L4S for the PDU session may be enabled or disabled when the establishment of the PDU session is based on a policy of the network. For example, an NG-RAN handling the PDU session (e.g., NG-RAN 412) may indicate whether it supports a congestion exposure such that the corresponding UPF (e.g., first UPF 406) may flag ECN marking. Accordingly, for a wireless device (e.g., device 414) established with multi-RAT dual connectivity or multi-connectivity, a master NG-RAN may inform the relevant system elements whether congestion exposure is supported, such as in the case where both the master NG-RAN and a secondary NG-RAN support congestion exposure.

In an alternative embodiment, a master NG-RAN may indicate that the master NG-RAN supports congestion exposure. In this case, the PDU session may be established for bearers of the master NG-RAN. In one such scenario, either the master NG-RAN or a secondary NG-RAN may indicate that the secondary NG-RAN supports the congestion exposure, and where the master NG-RAN or the secondary NG-RAN is configured to ensure that the PDU session maps to one or more bearers of the secondary NG-RAN to support congestion exposure for the PDU session.

In the case of PDU session establishment using non-3GPP access network, congestion exposure may be supported by the non-3GPP access network (e.g., MTS, ONT, etc.), an AGF (e.g., of W-5GAN 404), an N3IWF (e.g., N3IWF 416), and/or a TNGF. For example, the AGF may determine a congestion for a non-3GPP access network connected to the AGF, and for each 5G-RG (e.g., RG 402), based on one or more quality metrics, including without limitation, scheduling latency, packet drop ratio, and the like. The congestion indication may be determined for each relevant priority level and/or service flow supported by the non-3GPP access network, as well as for each 5G-RG supported by the AGF. Similar techniques may be employed in the case where the congestion indication is determined by the N3IWF or TNGF, such as for each IPSec, IPSec child service agreement, or UE.

The installed PCC rules may then indicate an IP address of N3IWF 416, as well as differentiated services code point (DSCP) values of user plane IPSec child service agreements of the overlay network that may require QoS differentiation by the underlying network. According to this approach, first UPF 406 of the underlying network is enabled to detect packets of the user plane IPSec child service agreements corresponding to the overlay network services that would require QoS support by the underlying network.

In some cases, a non-3GPP access network may not support a congestion exposure. In such instances, for a PDU session established using such a non-3GPP access network, the 5G core may enable ECN marking of the PDU session in the non-3GPP access network when L4S is enabled. That is, the 5G core may ensure ECN marking when the non-3GPP access network provides an indication that it supports L4S. In some embodiments, this indication may be provided by a 5G-RG (e.g., RG 402) or a UE (e.g., device 414), such through a registration procedure and/or a PDU session establishment procedure thereof, rather than UPF-based L4S marking.

In at least one embodiment, in the case where a congestion level or access network level performance metric is exposed to the 5G core, a network exposure function (NEF), and/or a relevant third party, the exposed congestion level information may include an indication whether the information is for 3GPP access or non-3GPP access. In the case where non-3GPP access is indicated, the information may further include a clarification indication of a trusted (e.g., TNGF), an untrusted (e.g., N3IWF), or a wireline (e.g., W-AGF) access.

Congestion Level Non-Exposure on a Non-3GPP Access Network with Path Switching

In an exemplary embodiment, L4S ECN marking may be updated using the UPF when a PDU session is switched from 3GPP access to non-3GPP access. In one example, UPF-based ECN marking may be enabled for a first 3GPP access PDU session, and then disabled for a second non- 3GPP access PDU session. Accordingly, when ATSSS is established for 3GPP access and non-3GPP access with L4S enabled, a multi-access PDU (MA-PDU) session of the ATSSS may be enabled with L4S on the NG-RAN and the non-3GPP access network when both the NG-RAN and the non-3GPP access network support ECN marking, that is, when traffic splitting or a steering mode are utilized. This path switching capability thus represents a significant improvement over conventional techniques, since the UPF, even when enabled with ECN marking, may not change an ECN field of a PDU packet IP header. This conventional challenge exists even in response to the PDU packet being delivered through non-3GPP access, regardless of the congestion status of the PDU packet.

3GPP and Non-3GPP Policies for XR Applications

In an exemplary embodiment, L4S with ECN marking may be indicated or configured as a policy for an application/XR application, such as when the ECN marking is achieved using the UPF, NG-RAN, or access network. In the case of a non-3GPP access network, ECN marking may be assumed to occur at the access level, and thus UPF marking may not be indicated for non-3GPP access. Nevertheless, when UPF marking is enabled or configured with an XR application, access network level congestion marking may be assumed to be used for non-3GPP access in the case where a PDU session of the XR application is executed through the non-3GPP access network.

In some embodiments, an L4S policy for an XR application may indicate whether L4S is used for only one or both of 3GPP access and non-3GPP access. In this scenario, the L4S policy may indicate L4S enablement for (a) each access type, or (b) each gateway function, to the 5G core (e.g., to the N3IWF, TNGF, AGF, etc.). For example, in the case where the 3GPP access network supports L4S, but the non-3GPP access network supports only ECN tagging, the L4S may be disabled. However, when a PDU session is reestablished or switched between the non-3GPP access network and the 3GPP access network, an application may be informed of the reestablishment or switching such that the application may then enable (or disable in the reverse scenario) L4S. In an exemplary embodiment, the application may represent an XR application for a wireless device or a server.

In some embodiments, a common policy may be applied or configured for a group of devices/UEs operating or collaborating with a same XR application. In this example a first device of the group of devices/UEs may serve the XR application through 3GPP access (e.g., an NG-RAN), whereas a second device of the group of devices/UEs may serve the XR application through non-3GPP access (e.g., a WLAN, a wireline) where the common policy may not be easily applied. The common policy may, for example, include a first policy set for 3GPP access and a second policy set non-3GPP access. Accordingly, one or both of the first and second devices may apply the first policy set when a PDU session is established for the XR application over the 3GPP access, and the second policy set when a PDU session is established over the non-3GPP access.

In an embodiment, a common policy may be similarly applied to an ATSSS rule between 3GPP and non-3GPP access. For example, a UE may follow the 3GPP access of an ATSSS when the common policy applies to 3GPP access for the UE. In contrast, when the UE applies the common policy for non-3GPP access, the UE will follow the non-3GPP access of the ATSSS rule. Accordingly, the common policy may be advantageously configured based on an ATSSS rule regardless of whether the UE supports the ATSSS.

In an embodiment, a wireless device may establish a PDU session through 3GPP access or non-3GPP access when a common policy is configured for the wireless device. In one scenario, the common policy may indicate a preferred access type (e.g., 3GPP or non-3GPP), and the wireless device may establish the PDU session using the preferred access type. For example, a 5G system may establish a common policy for a group of wireless devices or UEs where the group of wireless devices and the UEs use a same access type (e.g., NR, LTE, wireline, WLAN, trusted, untrusted, etc.).

PDU Set Over Non-3GPP Access Networks

In an exemplary embodiment, an entire PDU set (described above) may be delivered to an access network when ATSSS or MA-PDU is utilized. Accordingly, in the case where steering, switching, duplication, or splitting occurs, such operations may be executed at the PDU set level, as opposed to the level of each PDU packet.

Thus, in some embodiments, an entire PDU set may be disabled when a PDU session is established over non-3GPP access. Similarly, the PDU set may be not used for a MA-PDU session where at least one leg of the PDU set is over non-3GPP access, and particularly in the case where it is desirable to handle all PDUs of the PDU set the same, as described above. Thus, when an MA-PDU session is established over an N3IWF-to-a-standalone-non-public-network (SNPN), e.g., including an NG-RAN and non-3GPP access, the entire PDU set may be not enabled due to the mix of access types. In contrast, when the MA-PDU session is established over N3IWF/TNGF-to-an-SNPN including an NG-RAN and 3GPP access, the PDU set may be enabled, since the N3IWF/TNGF may be enabled to transfer PDU set information using additional information in the IP header.

This result may be different though, in the case where an N3IWF/TNGF/AGF path is used for the PDU session. For example, the N3IWF, TNGF or W-AGF may receive a GTP-U including information for a PDU set; however, in some cases, the N3IWF, TNGF, or W-AGF may ignore the PDU set information. In the case of a PDU set being used though, for a non-3GPP access network, the N3IWF, TNGF, or W-AGF may be configured to map the PDU set to one or more priority or service flows understood by the non-3GPP access network.

According to the embodiments described above, the following improvements over conventional techniques are advantageously realized for XR applications and media services: (a) support of policy control enhancements to support multi-modality flows for coordinated transmissions by a single UE, such as in the case where a the PCF is configured to generate policies to support coordinated transmission based on provisioned information from an application function (AF); (b) support of policy control enhancements to support multi-modality flows for coordinated transmission by multiple UEs, such as in the case where the AF provides information indicating that the multiple flows belong to the same multi-modal service for multiple UEs, and/or where the PCF generates related policies for each of the multiple UEs; (c) support of 5G system information exposure for XR/media enhancements, including ECN marking for L4S based on the NG-RAN or the PSA UPF, as well as application programming interface (API)-based information exposure to the AF, including without limitation QoS notification control (QNC) for guaranteed bit rate (GBR) QoS flows, congestion information, data rate, delay difference, round trip delay of QoS flows, estimated bandwidth for 5G QoS identifiers (5QIs), etc.; (d) support of PDU set-based QoS handling, including (i) PDU set integrated handling and differentiated handling, (ii) PDU set-based QoS Parameters with PCF determination and provisioning from AF-provisioned information, (iii) PDU set information identification and marking by the PSA UPF, and (iv) enhancement for uplink PDU set handling; (e) support of uplink-downlink transmission coordination to meet round-trip latency requirements, including uplink-downlink round-trip latency split for packet delay budgets (PDBs) having different QoS flows (e.g., considering AF QoS requirements), and QoS monitoring to adjust the uplink and downlink PDBs; (f) support of policy enhancements for jitter minimization, including AF and 5GC interaction for jitter monitoring and exposure, jitter requirements provisioning, and policy enhancements; (g) enhancements to power savings for XR services, including 5G system enhancement to provide assistance information to the NG-RAN (e.g., using an NG application protocol (NGAP) message and GTP-U header); and (h) improved trade-off between quality of experience (QoE) and power saving requirements, including PCC rule generation and updates based on media codec information from the AF.

XR with Multi-Access PDU

As described above, the conventional 3GPP access base station or NG-RAN may serve as the entity that exposes congestion level to one or more XR applications. However, when a wireless device conventionally connects to the 5GC by non-3GPP access means (e.g., wireline, cable, fiber, WLAN, Wi-Fi, etc.), the XR application may not be able to utilize the congestion information to adapt, since the non-3GPP access means will not typically expose such congestion information to the XR application. Thus, conventionally, the QoS through non-3GPP access may be significantly degraded in comparison to the QoS realized through 3GPP access.

Conventionally, an MA-PDU session and/or ATSSS are used to provide a seamless or low-interruption PDU or packet switching between a 3GPP access (e.g., NR, LTE, etc.) and non-3GPP access (e.g., trusted, untrusted, Wi-Fi, wireline, etc.). A MA-PDU session, for example, may be established where a common PDU session anchor (PSA) of a UPF is configured to set up multiple paths or legs using one or more of the available 3GPP accesses and/or one or more of the available non-3GPP accesses. ATSSS and MA-PDU have proved efficient means to support low interruption time when a good quality path changes from one access type to another access type. 3GPP TS 23.501, for example, further defines 5G System Architecture and Support for ATSSS.

Conventionally, however, ATSSS provides few rules to transfer, steer, or switch the traffic. For example, steering mode can switch a PDU session from one access type to another access type based on availability of the access type, a smallest delay determined from a UE-UPF measurement, a load balancing, or a set priority level. In some instances, threshold levels may be provided or predetermined to trigger load balancing or priority steering. For example, when a round trip time or packet loss rate exceeds a certain threshold of an access type, a portion of the corresponding traffic may be moved to the different access type. Conventionally, however, the relevant measurements are based on a UE-UPF or a UE-to-performance-measurement-function (PMF) for round-trip delay, packet drop ratio, and/or access availability. Thus, in the case when a congestion occurs in one network, the needed measurement request packet(s) may not be delivered quickly enough within the delay or latency criteria, which may result in the XR application adapting too slowly when network congestion is indicated. This challenge is overcome according to the following ATSSS solutions for an XR application.

Enhanced PDU Set Steering Modes

In an exemplary embodiment, ATSSS techniques may be implemented to enable transmission of PDU packet(s) from a MA-PDU session over a highest priority access among several access levels established for the MA-PDU session. The highest priority access transmission may continue until either a UE or UPF of the MA-PDU session, and/or a network managing the MA-PDU session, detects congestion for that access. For example, in the case of a wireless device established with a MA-PDU session over both of an NR and a trusted WLAN (TNGF), priority may be given to the trusted WLAN. In this example, a network may transmit the PDU packet(s) of the MA-PDU session using the trusted WLAN until congestion in/of the trusted WLAN is detected. In some embodiments, the network may identify the congestion using such techniques as a UE-triggered measurement or a network-triggered measurement (e.g., round trip delay, packet drop rate, etc.).

In an exemplary embodiment, a trusted WLAN utilizing L4S may handle a high priority packet differently from other priority packets when a congestion occurs or is detected. In this case, for an application enabled with L4S, a UE utilizing the application may indicate, to an application server of the application, the transport through, for example, the ECN field of an IP header. Accordingly, when measurement packets are used to measure round trip delay or packet loss rate, assuming that the measurement packets utilize the same priority and L4S framework (e.g., ECN tagging) as the application, the L4S-based round trip delay/packet drop rate may be minimized, despite the congestion, since the measurement packets may be treated with a high priority status in the network through the L4S framework. In the case of measurement packets using different priority and/or not L4S-enabled with, the measured round trip delay or packet drop rate may be different from the actual round trip delay or packet drop rate. However, even where L4S is enabled for an enhanced XR application, conventional 5G system priority-based steering mechanisms have experienced significant challenges.

In conventional 5G systems, the ability to split different PDU packets over two paths or two access networks (e.g., multiple access), based on priority or load-balancing, is determined by the particular implementation. That is, a consistent approach has not been established for XR applications for a PDU set (i.e., one or more PDU packets) of a PDU session with respect to when or how to transmit a higher importance first PDU set versus a lower importance second PDU set.

For example, in a conventional load-balancing mode, higher priority access may be indicated where the first PDU packet/set is transmitted at, or up to, a first load value assigned to the higher priority access. Other PDU packets/sets may then be transmitted to other lower priority access (es). Similarly, in priority-based conventional systems, high importance PDU set(s) may be transmitted over a priority access path until a congestion occurs in that priority access path. The conventional UPF or UE may be configured with various importance levels regarding PDU sets, which guide the UPF or UE regarding which PDU packets/sets to transmit over the priority access. Thus, when configured with two importance levels, the UPF or UE may regard one level for the priority access without a congestion, and the other level for the priority access with a congestion. The following embodiments thus present a new steering mode for XR applications, which overcomes these conventional limitations.

Figure 5:
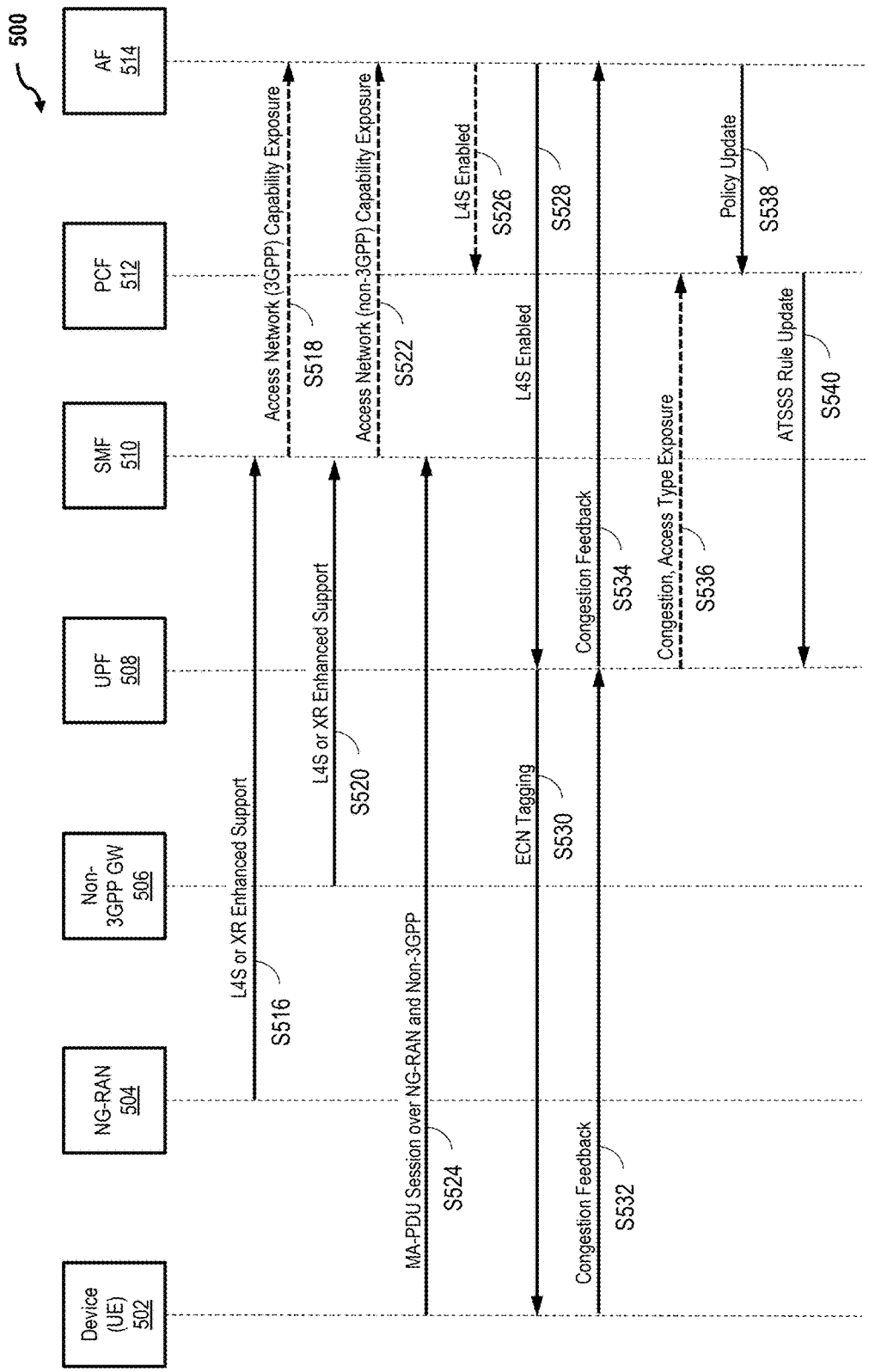
FIG. 5 is a sequence flow diagram depicting an exemplary steering process, in accordance with an embodiment.

FIG. 5 is a sequence flow diagram depicting an exemplary steering process 500. In an exemplary embodiment, process 500 is executed among and with respect to one or more of a device 502 (e.g., a UE), an NG-RAN 504, a non-3GPP gateway (GW) 506 (e.g., TNGF, N3IWF, W-AGF, etc.), a UPF 508, an SMF 510, a PCF 512, and an AF 514. Unless described below to the contrary, one or more of the several steps, subprocesses, and/or subroutines of process 500 may be performed in a different order, and/or two or more of the several steps/subprocesses/subroutines may be performed simultaneously.

In exemplary operation, process 500 begins at step S516, in which L4S and/or XR enhanced support is/are enabled between NG-RAN 504 and SMF 510. Step S518 is optional. In step S518, SMF 510 may inform AF 514 of the 3GPP access network capability of NG-RAN 504. In step S520, L4S and/or XR enhanced support is/are enabled between non-3GPP GW 506 and SMF 510. Step S522 is optional. In step S522, SMF 510 may inform AF 514 of the non-3GPP access network capability of non-3GPP GW 506.

In step S524, device 502 establishes an MA-PDU session over both NG-RAN 504 (i.e., 3GPP access) and non-3GPP GW 506 (i.e., non-3GPP access). Step S526 is optional. In step S526, AF 514 may inform PCF 512 that L4S is enabled for the MA-PDU session. In step S528, AF 514 notifies UPF 508 that L4S is enabled and, in step S530, UPF 508 performs ECN tagging for device 502, as described above.

In step S532, device 502 provides congestion feedback to UPF 508 (e.g., by marking the relevant ECN field, described above) and, in step S534, UPF 508 similarly relays the received congestion feedback to AF 514. Step S536 is optional. In step S536, UPF 508 informs PCF 512 of the congestion, and/or at least one of the access type exposures (e.g., 3GPP and non-3GPP, in this example). In step S538, AF 514 updates a policy for PCF 512 and, in step S540, PCF 512 provides an enhanced ATSSS rule update to UPF 508.

In the exemplary embodiment depicted in FIG. 5, process 500 is described with respect to a system implementing L4S-enabled priority-based access. The person of ordinary skill in the art though, will understand that this example is provided by way of illustration, and is not intended to be limiting. Other traffic management techniques may be implemented without departing from the scope herein.

In an exemplary implementation of process 500, for device 502 to establish an access network-based MA-PDU session (e.g., step S524), SMF 510 may determine whether one or more of the access means over which the MA-PDU session is established support L4S. For example, the MA-PDU session may be established by way of a first access that supports L4S, and a second access that does not support L4S. Thus, for an XR application, one policy may be to give priority to the access supporting L4S, irrespective of the original priority level given to that access. Thus, for this example, even in the case where the second access has priority, a UPF (e.g., UPF 508) may instead schedule the XR application over the first access due to the L4S support.

That is, in an exemplary embodiment, UPF 508 or SMF 510 may be configured to place a higher priority on L4S support capabilities over a predetermined priority policy. Nevertheless, in the case where multiple accesses may support L4S, one or more of device 502, UPF 508, and SMF 510 may follow the original policy to give priority to a particular one of the accesses that supports L4S.

In another example, a policy may be provided which sets priority based on L4S support and at least one other characteristic. In this scenario, wireless device 502 and/or SMF 508/UPF 510 may be configured to assume that priority will be given according to the L4S consideration and, when L4S is so enabled, the XR application (e.g., AF 514) will be able receive congestion feedback (e.g., step S534). In the case of downlink traffic, the congestion may then be exposed to a PCF (e.g., PCF 512, optional step S536). In some embodiments, the application (e.g., through AF 514) may request PCF 512 to change or update a policy (e.g., steps S538, S540) based on the congestion feedback.

In the exemplary embodiment depicted in FIG. 5, each access type (e.g., NG-RAN 504 for 3GPP access, non-3GPP GW 506 for non-3GPP access) may indicate to SMF 510 (or a network function) whether the particular access means supports L4S, ECN tagging, and/or XR application enhancements such as congestion exposure, measurement reporting, etc. In an exemplary embodiment, UPF 508 may expose such information to PCF 512 (e.g., optional step S536) to create an ATSSS rule (e.g., step S540). In an alternative embodiment, SMF 510 may be configured to expose such information to PCF 512.

Thus, for process 500, device 502 (e.g., a wireless UE) may establish a MA-PDU session over both of a 3GPP access and a non-3GPP access (e.g., step S524), and AF may inform PCF 512 (or, for example, a network function) whether L4S is enabled for an application or DNN. In an exemplary embodiment, for the MA-PDU session established for the application/DNN, it is assumed that L4S is enabled and utilized for at least for one access network. In the case of ATSSS, a multipath TCP (MP-TCP) or a multipath quick user datagram protocol (UDP) Internet connection (MP-QUIC) proxy may reside in UPF 508, where multiple connections or multiple QUIC connections end, and where a new TCP or a new QUIC between UPF 508 and AF 514 is established.

Accordingly, when an MP-TCP or MP-QUIC proxy operates in UPF 508, UPF 508 may inform whether UPF 508 supports L4S and, if so, the congestion feedback (e.g., step S532, such as a congestion indication from device 502) may be consumed by UPF 508 and then copied over a TCP or QUIC to the application (e.g., to AF 514 in step S534). Thus, in step S524, when device/UE 502 establishes the MA-PDU session, the device 502 may further indicate whether the UE supports L4S for the session. This information may then be utilized to select a UPF (i.e., UPF 508, in this example) that supports L4S. Therefore, in the case of an MA-PDU session having UDP packets proxied by UPF 508, the UPF may be selected for the MA-PDU session in consideration of the UPF having the L4S or XR application capability.

In some embodiments, when UPF 508 provides feedback information to AF 514 (e.g., step S534), UPF 508 may further inform AF 514 of which access where the congestion is occurring. In at least one embodiment, AF 514 may additionally be informed regarding whether the XR application is established by way of a single access, an ATSSS, or an MA-PDU session. In an exemplary embodiment, UPF 508 may expose the congestion information to one or more network functions, to PCF 512 (e.g., step S536), and/or to AF 514, and further include, in the exposed congestion information, additional information regarding the access type or gateway type where the congestion occurs.

In an embodiment, PCF 512 may thus determine an ATSSS rule (e.g., step S540) based on L4S being enabled. Accordingly, when a PDU set or packet is tagged with congestion exposure (CE), AF 514 receive the congestion feedback (e.g., step S534) by way of one of the several access means, types, or networks available.

In some embodiments, two different ECN marking approaches may be utilized or enabled for the MA-PDU session. In a first approach of the two approaches, NG-RAN 504 or non-3GPP GW 506 may tag a received L4S-enabled IP packet with CE (e.g., ECT(1)). In the second approach, UPF 508 (e.g., a PSA) may tag the received L4S-enabled IP packet with CE (e.g., ETC (1) or the like). The first approach is described further below with respect to FIG. 6.

Figure 6:
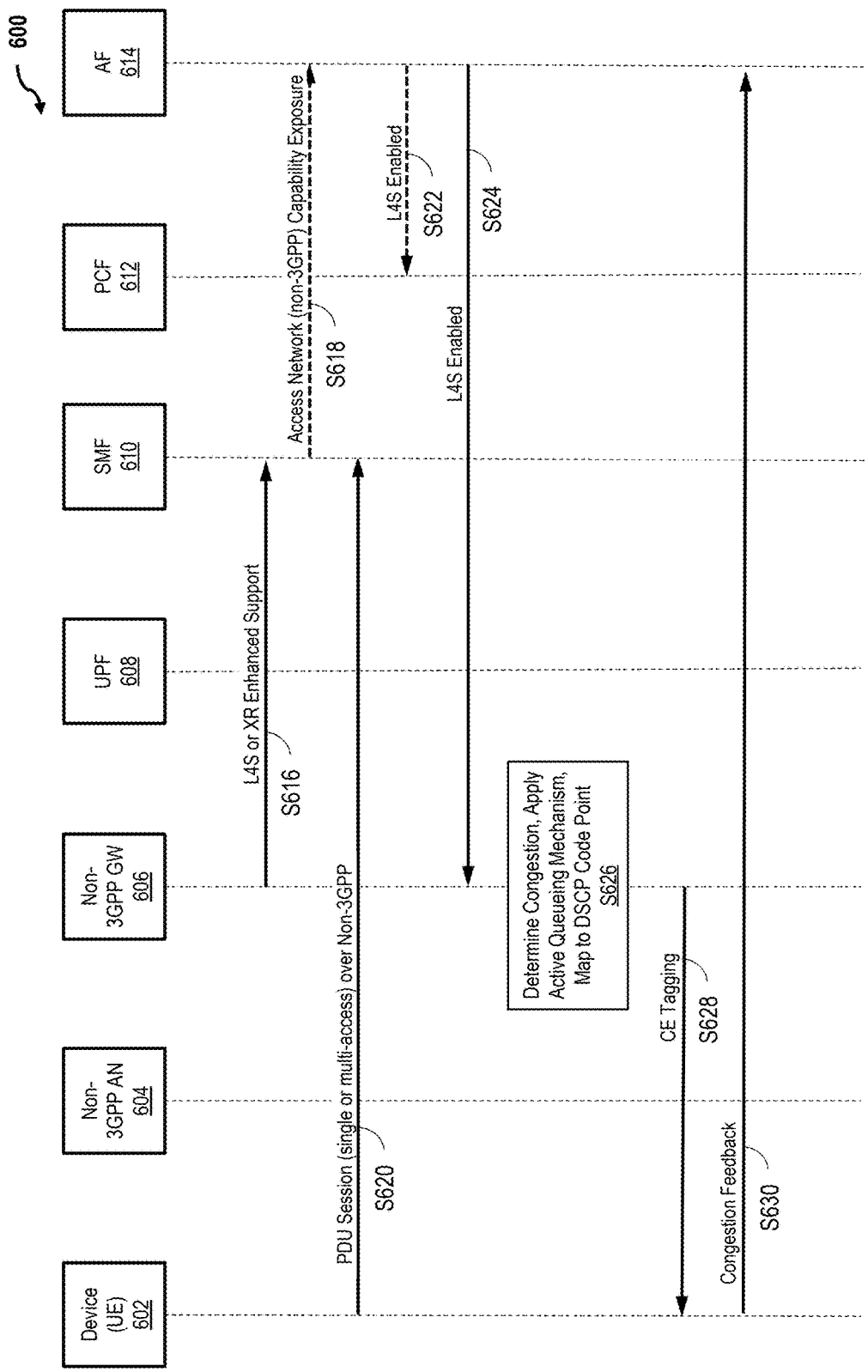
FIG. 6 is a sequence flow diagram depicting an alternative steering process, in accordance with an embodiment.

FIG. 6 is a sequence flow diagram depicting an alternative steering process 600. Process 600 is similar, in several aspects, to process 500, FIG. 5, and may be executed with respect to one or more of a device 602 (e.g., a UE), a non-3GPP access network 604, a non-3GPP GW 606, a UPF 608, an SMF 610, a PCF 612, and an AF 614. Unless described below to the contrary, one or more of the several steps, subprocesses, and/or subroutines of process 600 may also be performed in a different order, and/or two or more of the several steps/subprocesses/subroutines may be performed simultaneously.

In exemplary operation, process 600 begins at step S616, in which L4S and/or XR enhanced support is/are enabled between non-3GPP GW 606 and SMF 610. Step S618 is optional. In step S618, SMF 610 may inform AF 614 of the non-3GPP access network capability of non-3GPP GW 606. In step S620, device 602 establishes a single or multi-access PDU session over non-3GPP access (e.g., non-3GPP access network 604 and/or non-3GPP GW 606). Step S622 is optional. In step S622, AF 614 may inform PCF 612 that L4S is enabled for the PDU session. In step S624, AF 614 notifies non-3GPP GW 606 that L4S is enabled and, in step S626, non-3GPP GW 606 determines the congestion, and may further apply an (e.g., predetermined) AQM such as L4S, and perform mapping to an appropriate DSCP code point. In step S628, non-3GPP GW 606 tags the ECN to device 602 for CE and, in step S630, device 602 provides congestion feedback to AF 614.

Process 600 is thus similar, in many aspects, to process 500, FIG. 5, except that in process 600, the (R)AN (e.g., non-3GPP GW 606 or non-3GPP access network 604) tags the ECN with an explicit congestion CE. In the embodiment depicted in FIG. 6, the (R)AN may be further configured to inform UPF 608 (or a network function) when congestion or a start of congestion is detected. In the case where the (R)AN does not expose the congestion information, L4S feedback from device/UE 602, or to AF 614, may be used to determine a congestion from a particular access means.

In an alternative embodiment, UPF 608 may be configured to tag the ECN field for an explicit congestion CE. That is, in this alternative scenario, the (R)AN may be required to expose a congestion event, a start of congestion, and/or an end of congestion. However, in the case where non-3GPP GW 606 or 3GPP access network 604 informs that congestion exposure is not supported, UPF 608 or SMF 610 may inform PCF 612 of such, to then enable L4S ECN tagging to be performed at the (R)AN. Accordingly, when a (R)AN or a non-3GPP GW function (e.g., TNGF, N3IWF, W-AGF, etc.) notifies of L4S or XR application support, such notification may further include information indicating additional support for one or more of (a) CE marking, (b) queueing handling (e.g., double queue of L4S), (c) congestion exposure, and (d) other information exposure. Based on the capabilities from the access network, the 5G core (not shown in FIG. 6) may determine which mechanism will be used for an XR application for L4S.

In an exemplary embodiment, a gateway function may also, or alternatively, support L4S. For example, an N3IWF, a TNGF, or a W-AGF may support an L4S mechanism such as AQM, ECN tagging, and/or the like. In some cases, a double queue may reside in the gateway function such that when a packet arrives, an appropriate queue may be selected based on whether the packet is L4S-enabled. Within the queue, a priority value for an access (e.g., a WLAN) or a service flow (e.g., a hybrid fiber-coaxial (HFC) network) may be selected accordingly. In some embodiments, the priority value may be selected based on real-time feedback information from the relevant access network(s) regarding a queue size for each priority level and/or a delay on the priority level. In other embodiments, the access network may inform the gateway whenever a packet is scheduled by the access network.

In an embodiment, device 602 may be a UE, a wireless device, and/or an RG such as a 5G-RG or FN-RG. Device 602 may be configured to communicate or interact with a TNGF, N3IWF, or W-AGF of non-3GPP GW 606 regarding potential network congestion exposure. In some cases, UE 602 may be further configured to insert a time-stamp for each packet/IP packet to non-3GPP GW 606, and non-3GPP GW 606 may then additionally insert a time-stamp for each packet/IP packet to device 602. From such additional capabilities, one or both of device 602 and non-3GPP GW 606 may be enabled to measure a delay of the packet/IP packet based on the inserted time-stamp(s). Accordingly, when this delay is measured to exceed a particular predetermined threshold, device 602 may inform non-3GPP GW 606 of the congestion, or vice versa.

In some embodiments, non-3GPP GW 606 may determine a congestion based on an exposure from an application. For example, the application (e.g., AF 614) may be further configured to indicate a congestion to non-3GPP GW 606 when the application receives congestion feedback from device/UE 602 (e.g., step S630). In some cases, the congestion may be determined based on the delay, as described immediately above. In other cases, the congestion is determined based on the packet loss rate. In an embodiment, the packet loss rate may be measured by a UE application layer of device 602 or, where device 602 includes an RG, the packet loss rate may be informed by a device behind the RG running the application.

In at least one embodiment, a link control protocol (LCP) (see e.g., RFC 1661) may be used to determine a packet drop based on a quality-protocol procedure. Alternatively, an LCP echo request/response message may be utilized where non-3GPP GW 606 or device/UE 602 transmits an LCP echo request and receives the LCP echo response. From this echo request-and-response, either of non-3GPP GW 606 and device/UE 602 may be further configured or enabled to measure the round trip delay therefrom. In some cases, non-3GPP GW 606 may be still further configured to determine that the priority of the LCP echo messages is set to the same priority of the XR application, such that the measured latency or round trip delay may reflect the actual link quality for the XR application.

XR with Redundancy

In the case of edge computing, conventional solutions are known to require strict end-to-end network latency requirements and reliability guarantees. Such conventional solutions are further known to generate significant amounts of data, which typically require data localization. Since some such use cases are geared toward short-term deployments, it has been essential that conventional communication service provider (CSP) networks provide such end-to-end application services. However, the conventional CSP 5G core network is not, at present, capable of supporting strict latency requirements, since this conventional network is not presently edge-aware to (a) support edge compute use cases, and (b) enable Edge Compute Service Providers (ESPs) to deploy the solutions for these use cases. The following embodiments address these conventional edge computing challenges by improving the network capability to be aware of the location(s) of the edge application client(s) and server(s) to enable the relevant applications to be hosted closer to a UE's access point/point of attachment.

The TS Group SA Working Group 2 (SA2) defines an extension to the 5G system, as well as operational procedures to support edge computing applications. SA2 further defines 5G system enhancements to support edge computing server applications deployed at edge-optimized hardware (e.g., the Edge Hosting Environment (EHE)), and in a network operator data network (DN) connected to a UPF. The DN may be centralized, i.e., a central DN, and may also have a local part deploying the EHE. The local part of the DN may further be configured to have user plane connectivity with both of (a) a centrally deployed PSA (C-PSA), such as a UPF acting as a PDU session anchor, and (b) a locally deployed PSA (L-PSA) of the same DN.

SA2 further defines (a) operational procedures such as local routing and traffic steering, session and service continuity, and AF-influenced traffic routing, that are leveraged to support edge compute applications, and (b) new network function(s) to support discovery of optimal edge application server instance and application server instance relocation based on client device (e.g., UE) mobility or network events. SA2 5G system extensions for edge computing also enable cloud-native applications to support edge computing use cases without requiring redevelopment for edge computing awareness. With this support, "edge unaware" applications are enabled to seamlessly migrate and support edge computing use cases having such 5G system extensions and/or, for example, UE host operating system extensions.

Figure 7:
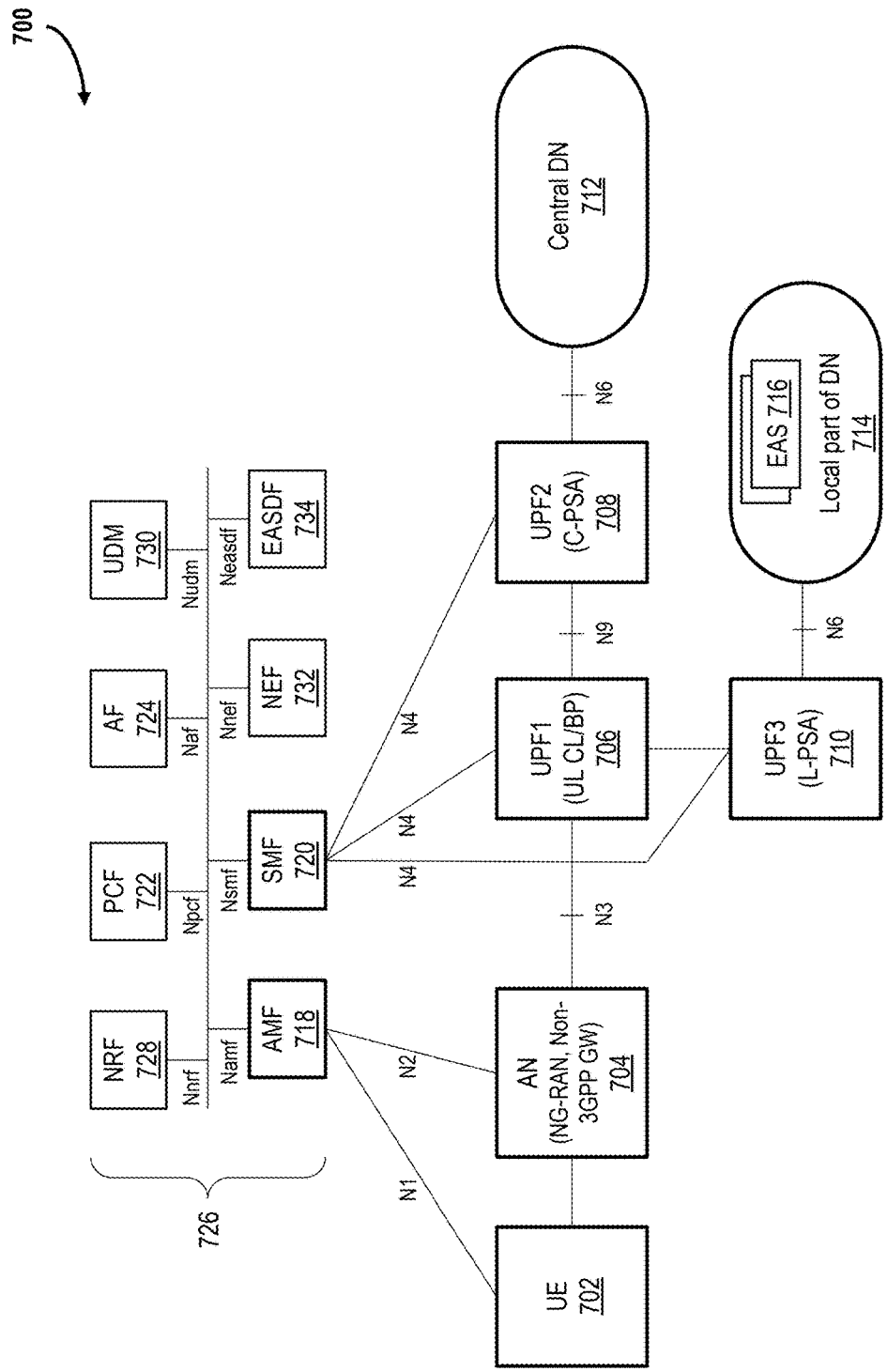
FIG. 7 is a schematic illustration depicting an exemplary edge computing architecture, in accordance with an embodiment.

FIG. 7 is a schematic illustration depicting an exemplary edge computing architecture 700. In the exemplary embodiment depicted in FIG. 7, edge computing architecture 700 represents an SA2 edge computing reference architecture that supports edge computing based on 5G core network reference architectures, and is therefore similar, in a number of aspects, to network architecture 400, FIG. 4, and includes one or more elements having the same structures and/or functionalities to similarly-labeled elements of network architecture 400.

For example, similar to network architecture 400, edge computing architecture 700 may include, in an exemplary embodiment, a wireless device/UE 702, one or more access networks 704 (e.g., NG-RAN 704(1), non-3GPP 704(2), etc.), and a first UPF 706 (e.g., for Uplink Classifier (UL CL) and/or multi-homing Branching Point (BP) mechanisms (UL CL/BP)) in communication with a second UPF 708 (e.g., for C-PSA) and a third UPF 710 (e.g., for L-PSA). In this example, second UPF 708 is further in communication with a central DN 712, and third UPF 710 is further in communication with a DN local part 714. DN 714 may, for example, include one or more edge application servers (EAS) 716.

Also similar to network architecture 400, edge computing architecture 700 further includes one or more of at least one AMF 714, at least one SMF 720, a PCF 722, and an AF 724. In the exemplary embodiment, AMF 714 is in operable communication with some or all of UE 702, access network (s) 704, PCF 722, and AF 724. Similarly, SMF 720 may be in operable communication with some or all of first UPF 706, second UPF 708, and third UPF 710, as well as PCF 722 and AF 724. In an embodiment, AMF 718 and SMF 720 may constitute a portion of a network function layer 726 that further includes one or more of a network repository function (NRF) 728, a UDM 730, an NEF 732, an a newly introduced edge access server discovery function (EASDF) 734.

In the exemplary embodiment, edge computing architecture 700 extends the 5G core architecture (e.g., network architecture 400, FIG. 4) through the introduction of EASDF 734, which enables application clients (e.g., UE 702) to discover a most optimal instance of the EAS (e.g., EAS 716). In this manner, the UPFs (e.g., UPFs 706, 708, 710) defined by the 5G core may be extended to support routing/re-routing of the traffic from access class (e.g., AN 704) to EAS server(s) 716. Accordingly, edge computing architecture 700 may be utilized for both non-roaming and local breakout (LBO)-roaming scenarios, and illustrates the relationship between the 5G system and a DN (e.g., central DN 712, DN local part 714), in which one or more EAS 716 is/are deployed in an EHE.

In exemplary operation of architecture 700, edge application traffic may be routed to an EAS 716 hosted in DN local part 716, either by an uplink (UL) or downlink (DL) classifier or multi-homing branching solution (e.g., UL CL/BP of first UPF 706), and the remaining traffic may be routed through a C-PSA UPF (e.g., second UPF 708). In the case of UE mobility event, such as when UE 702 moves to different location, or a serving EAS 716 becomes sub-optimal, UE 702 may alternatively connect to a new L-PSA UPF (e.g., third UPF 710) that connects to a different EAS 716 that is determined to be more optimal (e.g., utilizing EASDF 734). Although 3GPP does not presently define a framework to identify an optimal EAS, 3GPP does define useful network attributes, such as UE location, network state, and predicted/estimated data paths to EAS attachment points, which may be utilized to assist in the optimal EAS identification functionality of edge computing architecture 700.

For ease of explanation, only the control plane of EASDF 734 is depicted in FIG. 7. The person of ordinary skill in the art will understand though, that the user plane between EASDF 734 and UPFs 706, 708, and/or 710, over which domain name system (DNS) messages may be exchanged, is represented by the N6 interface(s).

3GPP SA2 and SA6 groups have further defined standards-based networks and application architectures so that communication service provider (CSP) networks can support edge computing use cases and the associated service requirements therefor. That is, SA2 defines a network architecture that enables conventional cloud native applications to migrate to the edge computing infrastructure, and SA6 defines an edge computing application framework that enables applications to utilize 3GPP core network capabilities for supporting edge computing use cases, i.e., a skeleton framework for edge native application development.

3GPP TS 23.548 defines, for SA2, the following three connectivity models between 5GS and data network that hosts application server: (1) the Distributed Anchor Point connectivity model; (2) the Session Breakout connectivity model; and (3) the Multiple PDU Sessions connectivity model.

For the Distributed Anchor Point connectivity model (1), the anchor UPF is disposed at a local site (e.g., third UPF 710) relatively close to/proximate the UE location. The local site, namely, the L-PSA UPF, may thus change in the model to account for UE mobility and use of session and service continuity (SSC) modes 2 or 3.

For the Session Breakout connectivity model (2), the PDU Session has a PSA UPF disposed at a central site (e.g., second UPF 708), as well as one or more L-PSA UPF(s) (e.g., third UPFs 710). Edge application traffic may then be selectively diverted to the L-PSA UPF using UL CL/BP mechanisms (e.g., first UPF 706).

For the Multiple PDU Sessions connectivity model (3), the edge computing applications may establish one or more PDU Sessions with one or more L-PSA UPFs (e.g., third UPFs 710) to connect to the EHE of DN local part 714. The remaining applications may utilize the C-PSA UPF (e.g., second UPF 708). Similar to the Distributed Anchor Point connectivity model, for the Multiple PDU Sessions connectivity model, the L-PSA UPF (e.g., third UPF 710) may also change due to UE mobility, e.g., using SSC mode 3 with multiple PDU Sessions.

As described above, in the case of XR applications utilizing PDU sets, a client device (e.g., a wireless device, an XR application, etc.) may need to receive all PDUs of a PDU set, particularly in the case of audio/video PDU sets. However, when a PDU set is enabled, a particular access network (e.g., NG-RAN, non-3GPP access, etc.) may elect to drop an entire PDU set in the case where one or more PDU packets of the PDU set are dropped. For example, a conventional access may drop a first PDU packet due to network congestion, queue overflow, handover, or similar reasons, and then may drop a subsequent second PDU packet of the same PDU set based on the first PDU packet being dropped.

Additionally, a conventional server (e.g., an XR server, an XR application producer, an XR application server, etc.) may transmit the first PDU packet of over a plurality of access networks (e.g., through base stations, centralized units (CUs), distributed units (DUs), radio units (RUs), access nodes, CMTS, fiber amplifiers, ONTs, OLTs, modems, fixed wireless accesses (FWAs), etc.) or paths. When a client device receives a first PDU packet of a PDU set over a particular access network/path of the several access networks, the conventional server will only transmit a subsequent second PDU packet of the same PDU set over the same particular access network. However, in the case where the second PDU packet is dropped, the conventional client device would likely be unable to recover or decode the entire PDU set.

Therefore, dropping the second PDU packet would prevent recovery of the PDU set over the particular access network, even without detected network congestion on that access network. This conventional challenge results in significant resource waste and degraded QoS. The following embodiments provide innovative solutions that overcome these conventional challenges.

In an exemplary embodiment, enhanced PDU handling techniques are provided for a variety of transport scenarios and mechanisms, including without limitation, a plurality of transport paths, a plurality of access networks, path redundancy, path switching, and/or transport relays. In some embodiments, MA-PDU sessions and/or ATSSS are implemented to support seamless or low-interruption packet switching between a 3GPP access type/network (e.g., NR, LTE, etc.) and a non-3GPP access type/network (e.g., trusted, untrusted, wireline, etc.). In at least one embodiment, an enhanced MA-PDU session is established using a common PSA of a UPF to utilize multiple paths or legs over one or more 3GPP accesses and/or non-3GPP accesses.

In an exemplary embodiment, an enhanced XR application utilizes one or more new features, including without limitation, a PDU set, L4S, and access node QoS handling and exposure, which may, for example, be based on single transport or a PDU session for the XR application. In some embodiments, the enhanced XR application may further implement one or more of Packet Data Convergence Protocol (PDCP, e.g., defined in 3GPP TS 38.323) duplication, ATSSS repetition and multi-homing, and/or multiple PDU sessions, e.g., where the enhanced XR application may be delivered utilizing a plurality of access networks and/or PDU sessions.

Redundancy at Core Network

In an exemplary embodiment, an MA-PDU session established by a client or server hosting an XR application may include a first PDU session over a first access network (e.g., 3GPP or non-3GPP) and a second PDU session over a second access network (e.g., 3GPP or non-3GPP). The MA-PDU session for the XR application may enable the first and second PDU sessions with a PDU set, e.g., a PDU packet GTP-U header may include a PDU set identifier and/or a PDU set importance. According to conventional techniques, however, a first access node (e.g., base station, CU, DU, RU, non-3GPP access node, etc.) of the first access network may not be aware whether the first PDU session is part of the MA-PDU session, or instead may be a single access PDU session. That is, the first access node may not be aware of a policy for the MA-PDU session (e.g., based on splitting, switching, load balancing, replication, etc.). The same may be the case for a second access node of the second access network.

In the exemplary embodiment, either of the first and second access nodes may receive a request message for one or both of the first and second PDU sessions. In this example, either of the PDU session request messages may indicate that the particular PDU session is part of the MA-PDU session, e.g., such as by a PDU session request type, thus enabling either of the first and second access nodes to set either or both of the first and second PDU sessions as an MA-PDU session. Accordingly, when the first and/or second PDU session is so enabled with the PDU set, the first and/or second access node may be further configured such that a subsequent PDU packet of the PDU set will not be dropped even in the case where a previous PDU packet has been dropped by one of the access nodes. That is, the first and/or second access nodes may be configured with a policy to disable dropping for PDU packets of the PDU set when one of the first and second PDU sessions is identified to belong to the MA-PDU, or to be of an MA-PDU type. In some cases, the policy may be further configured to enable/re-enable packet dropping.

In an exemplary embodiment, a core network (e.g., a 5G core, Enhanced Packet Core (EPC), 5G network, 4G network, 6G network, satellite network, wireline network, broadband network, cable network, etc.) may inform an access node regarding the handling of a PDU set and/or one or more parameters/policies related to a PDU session of an XR application. The policy, for example, may indicate one or more of: (a) to drop a PDU set if any PDU packet of the PDU set is dropped; (b) to not drop a PDU set, even if one or more PDU packets of the PDU set is dropped; (c) a PDU session of the XR application is based on a MA-PDU session; (d) the PDU session of the XR application is based on a replication of a MA-PDU session; and/or (e) a threshold value where the access node may be required or expected to drop the PDU set if a percentage of dropped PDU packets of the PDU set exceeds the threshold value (e.g., (i) a ratio of dropped PDU packets of a PDU set, (ii) a number of dropped PDU packets of a PDU set at or above which the entire PDU set may be dropped, and/or (iii) a jitter boundary or a latency boundary of a PDU set, above which the entire PDU set may be dropped if a measured jitter or a measured latency of the PDU set exceeds the boundary).

In an exemplary embodiment, the core network may configure the access network for a PDU session of the XR application such that one or more policies and/or conditions will apply thereto. Such conditions may, for example, include without limitation: (a) a condition to drop an entire PDU set with a certain PDU set importance (e.g., based on an importance threshold value), and when one or more PDU packets of the PDU set are dropped; and/or (b) a condition to drop a PDU set if a GTP-U header indicate one or more condition parameters. Such condition parameters may indicate: (a) whether the PDU set is replicated; (b) whether to drop a PDU set based on one or more missing PDU packets of the PDU set; and/or (c) a QoS parameter or value (e.g., 5Qi, QCI, QFI) to enable (i) dropping a PDU set based on one or more dropped PDU packets of the PDU set, or (ii) not dropping a PDU set even if one or more PDU packets of the PDU set are dropped.

In an exemplary embodiment, a data network or XR application may further indicate whether to perform a PDU set-based dropping policy. For example, in the case where a PDU set-based dropping policy may indicate that an access network may drop an entire PDU set if one or more PDU packets of the PDU set are dropped, the data network or XR application may indicate that such policy will not be performed. Exemplary implementations of such policies and procedures are described further below with respect to FIGS. 8-10.

PDU Set Handling with ATSSS Enabled

Figure 8:
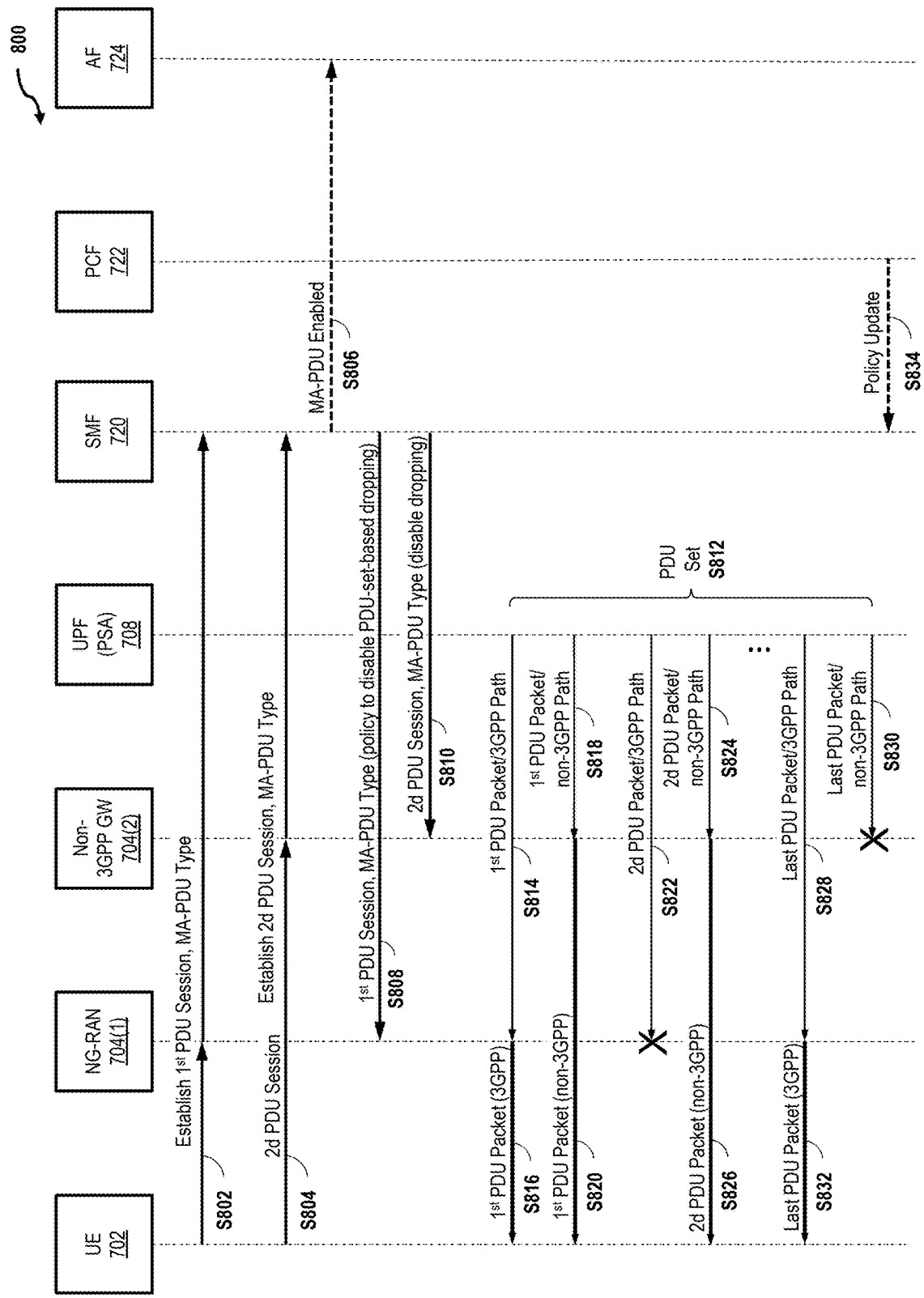
FIG. 8 is a sequence flow diagram depicting an exemplary steering implementation, in accordance with an embodiment.

FIG. 8 is a sequence flow diagram depicting an exemplary steering implementation 800. In the exemplary embodiment depicted in FIG. 8, process 800 is described with respect to exemplary edge computing architecture 700, FIG. 7. The person of ordinary skill in the art will understand that this architectural implementation is provided by way of example, and not in a limiting sense. Other multi-access and/or multi-path configurations may be implemented without departing from the scope herein. Accordingly, process 800 may be executed among and with respect to one or more of UE 702 (or a client device), NG-RAN 704(1) (or a first access network), non-3GPP GW 704(2) (or a second access network), UPF 708, SMF 720, PCF 722, and AF 724. Unless described below to the contrary, one or more of the several steps, subprocesses, and/or subroutines of process 800 may be performed in a different order, and/or two or more of the several steps/subprocesses/subroutines may be performed simultaneously. In the exemplary embodiment, process 800 is depicted for the case where ATSSS is enabled.

In exemplary operation, process 800 begins at step S802, in which UE 702 establishes a first PDU session of an MA-PDU type, through NG-RAN 704(1), with SMF 720. In step S804, UE 702 establishes a second MA-PDU type PDU session, through non-3GPP GW 704(2), with SMF 720. The person of ordinary skill in the art will understand that the first and second PDU sessions of process 800 may alternatively be established with the opposite access network, or may established with respect to two 3GPP access networks or two non-3GPP access networks. Step S806 is optional. In step S806, SMF 720 may inform the XR application, e.g., AF 724, that the first and second PDU sessions are MA-PDU enabled.

In step S808, SMF 720 indicates to first access network/ NG-RAN 704(1) at least one PDU set dropping policy for the first PDU session. In the exemplary embodiment depicted in FIG. 8, the indicated PDU set dropping policy is to disable dropping of an entire PDU set in the case of one PDU packet of the PDU set being dropped. In step S810, SMF 720 indicates to second access network/non-3GPP GW 704(2) at least one PDU set dropping policy for the second PDU session.

In step S812, process 800 enables UPF 708 to send the PDU set over both access networks 704(1), 704(2) with redundancy therebetween. In the exemplary embodiment depicted in FIG. 8, in substep S814, a first PDU packet of the PDU set is transmitted to the first access network/NG-RAN 704(1), which then forwards the sent first PDU packet, in substep S816, to UE 702, which successfully receives the first PDU packet over this 3GPP access path. In substep S818, the first PDU packet of the PDU set is also transmitted to the second access network/non-3GPP GW 704(2), which then also forwards, in substep S820, the sent first PDU packet to UE 702, which then also successfully receives the first PDU packet over this non-3GPP access path. That is, according to process 800, UE 702 is enabled to redundantly receive the first PDU packet by way of two different access networks.

Upon successful receipt, at UE 702, of the first PDU packet of the PDU set, process 800 proceeds to substep S822, in which a second PDU packet of the PDU set is transmitted to the first access network/NG-RAN 704(1). However, in this example, the second PDU packet is dropped by the 3GPP access network, and is therefore not delivered to UE 702 by way of the 3GPP access path. Under the conventional scheme, the entire PDU set would be dropped at this stage. According to the present embodiments though, in substep S824 the second PDU packet of the PDU set is redundantly transmitted over second access network/ non-3GPP GW 704, which, in substep S826, successfully delivers the second PDU packet to UE 702 over the non-3GPP access path.

In the exemplary embodiment, upon successful delivery of the first and second PDU packets to UE 702, substeps S814 through S826, or similar, may be repeated, as applicable, until the last PDU packet of the PDU set is transmitted, in substep S828, over the 3GPP access route to first access network/NG-RAN 704(1), and in substep S830, over the non-3GPP access route to second access network/non-3GPP GW 704(2). In this example though, for the last PDU packet of the PDU set, in step S832, UE 702 is able to successfully receive the last PDU packet or the 3GPP access path, whereas the last PDU packet is dropped by the non-3GPP path, and does not redundantly reach UE 702 thereby.

According to the example depicted in FIG. 8, utilizing ATSSS, UE 702 is enabled, through the PDU set-based dropping policy provided by SMF 720, to receive the first PDU packet over both access types, but the second PDU packet only over the non-3GPP access, and the last PDU packet only over the 3GPP access.

In the case where ATSSS is enabled, a wireless device (UE) is enabled to establish a first PDU session through the 3GPP access network (e.g., NG-RAN 704(1)), and a second PDU session through a non-3GPP access network (e.g. non-3GPP GW 704 (2)), where the first sessions and second PDU session are part of a MA-PDU session. Accordingly, once both sessions are established, the relevant network function (e.g., SMF, UPF, or AMF; UPF illustrated in FIG. 8) may expose (e.g., to AF 724) that the MA-PDU session has been established for the XR application. In response to the MA-PDU session being established (or, for example, an MA-PDU with replication policy being enabled), the network function may configure the 3GPP access network and/or the non-3GPP access network to disable PDU set-based dropping policy for the first and/or second PDU session being part of the MA-PDU session.

In response to such configuration by the relevant network function, the 3GPP and/or the non-3GPP access network(s) may not perform the PDU set-based dropping policy where, for example, the second PDU packet of a PDU set is dropped by the 3GPP access network (e.g., substep S822), whereas the first and last PDU packets of the PDU set are delivered to the wireless device through the 3GPP access network. That is, in the exemplary embodiment depicted in FIG. 8, the last PDU packet of the PDU set is dropped by the non-3GPP access network (e.g., substep S830), whereas the first and second PDU packets of the PDU set are delivered to the wireless device through the non-3GPP access network. According to these innovative and effective redundancy techniques, the wireless device (e.g., UE 702) is enabled to receive the first, second, and last PDU packets of the PDU set, and may thereby decode the PDU set.

PDU Set Handling for EDGE Computing

When edge computing is implemented with a branching point or breakout, the branching point may determine a path, access, or data network based on a particular PDU set. However, the branching point UPF (e.g., UL CL UPF) may not mix one or more PDU packets from/to a first data network and one or more second PDU packets from/to a second data network. As described above, for an edge application, PDU sessions may be supported by (1) distributed anchor point, (2) session breakout, and/or (3) multiple PDU sessions.

In an embodiment, an XR application may operate with or without an EDGE framework. For example, as described above with respect to FIG. 7, a central PDU session anchor (e.g., C-PSA UPF2 708) may be provided for a central data network node (DNN, e.g., central DN 712), a localized PSA (e.g., L-PSA UPF3 710) may be provided for a local DNN (e.g., local part of DN 714), and an additional UPF (e.g., UL CL/BP UPF1 706) may be provided to serve as a branching point and/or uplink classifier, and which may be collocated with or remotely disposed from the C-PSA and/or the L-PSA). In some embodiments, multiple PDU sessions may be established such that each PDU session thereof is established for a particular DNN. For example, a first PDU session may be established for a local DNN (e.g., local part of DN 714), and a second PDU session may be established for a central DNN (e.g., central DN 712).

In the case where an XR application is adopted with an Edge platform having a session breakout mechanism, the present embodiments both clarify and enhance the PDU set handling. In an embodiment, a core network may configure a first policy for a first DNN (e.g., central DN 712), but a second policy for a second DNN (e.g., local part of DN 714), whereas the first policy may enable a PDU set and/or L4S, but the second policy may disable a PDU set and/or L4S. In a conventional scenario for this example, an XR client device may receive one or more packets from the first DNN based on the PDU set being enabled, but also one or more packets from the second DNN based on the PDU set being disabled Accordingly, the entire PDU set may be dropped from the first DNN based on one or more PDU packets of the entire PDU set being dropped. Therefore, even if the XR client device receives, from the second DNN, packets belonging to the same PDU set, the XR client device may not be able to decode the PDU set if the conventional XR client has not received the entire PDU set from one DNN. Thus, in this scenario, the conventional client will experience a significant degradation of the performance and/or QoS based on session breakout.

These conventional challenges are overcome by the following embodiments. In an exemplary embodiment, a core network is advantageously configured to enable a PDU set for both DNNs (e.g., one or more PDU sessions based on the session breakout or multiple PDU sessions). In an alternative embodiment, the core network is configured to disable a PDU set for both DNNs, and/or the one or more PDU sessions. In at least one embodiment, the core network may be additionally, or alternatively, configured to (a) enable L4S for both DNNs and/or the one or more PDU sessions, or (b) disable L4S for both DNNs and/or the one or more PDU sessions.

In an exemplary embodiment, when a UPF serving as a branching point (e.g., UPF 706, FIG. 7) receives a first PDU packet of a PDU set from a first DNN (e.g., central DN 712) or first PSA (e.g., UPF 708), and a second PDU packet of the PDU set from a second DNN (e.g., local part of DN 714) or second PSA (e.g., UPF 710), the branching point UPF may determine to combine the first PDU packet and the second PDU packet based on an enabling or disabling condition for the PDU set. For example, when a first PDU session of an XR application from the first DNN (e.g., though the first PSA) and a second PDU session of the XR application from the second DNN (e.g., through the second PSA) are enabled with PDU set, the branching point UPF may merge the first and second PDU packets based on both PDU packets belonging to the same PDU set.

In an alternative embodiment, multiple PDU sessions may be determined for an XR application. For example, when a session breakout and/or multiple PDU sessions are implemented for session continuity and/or Edge computing, each branch of the session breakout PDU session (e.g., at least a first PDU session and a second PDU session of multiple PDU sessions) may be transported over/through an access network. Thus, in the case where a PDU set is enabled for the session breakout PDU session or the multiple PDU sessions (i.e., including the first PDU session and the second PDU session), the access network may receive a first PDU packet of the PDU set over a first branch or first PDU session, and a second PDU packet of the PDU set over a second branch or second PDU session.

In this exemplary scenario, once an access network determines that there are multiple PDU sessions for the XR application, the access network may be configured drop an entire PDU set if a PDU packet having a PDU packet identifier and a PDU set identifier is dropped from the first branch/first PDU session, and if another PDU packet having the same PDU packet identifier and PDU set identifier is also dropped from the second branch/second PDU session. Accordingly, unless both such conditions are present, the access network may be configured so it will not drop the entire PDU set even in the case where a PDU set-based dropping policy is enabled. An exemplary implementation of these principles is described further below with respect to FIG. 9.

Figure 9:
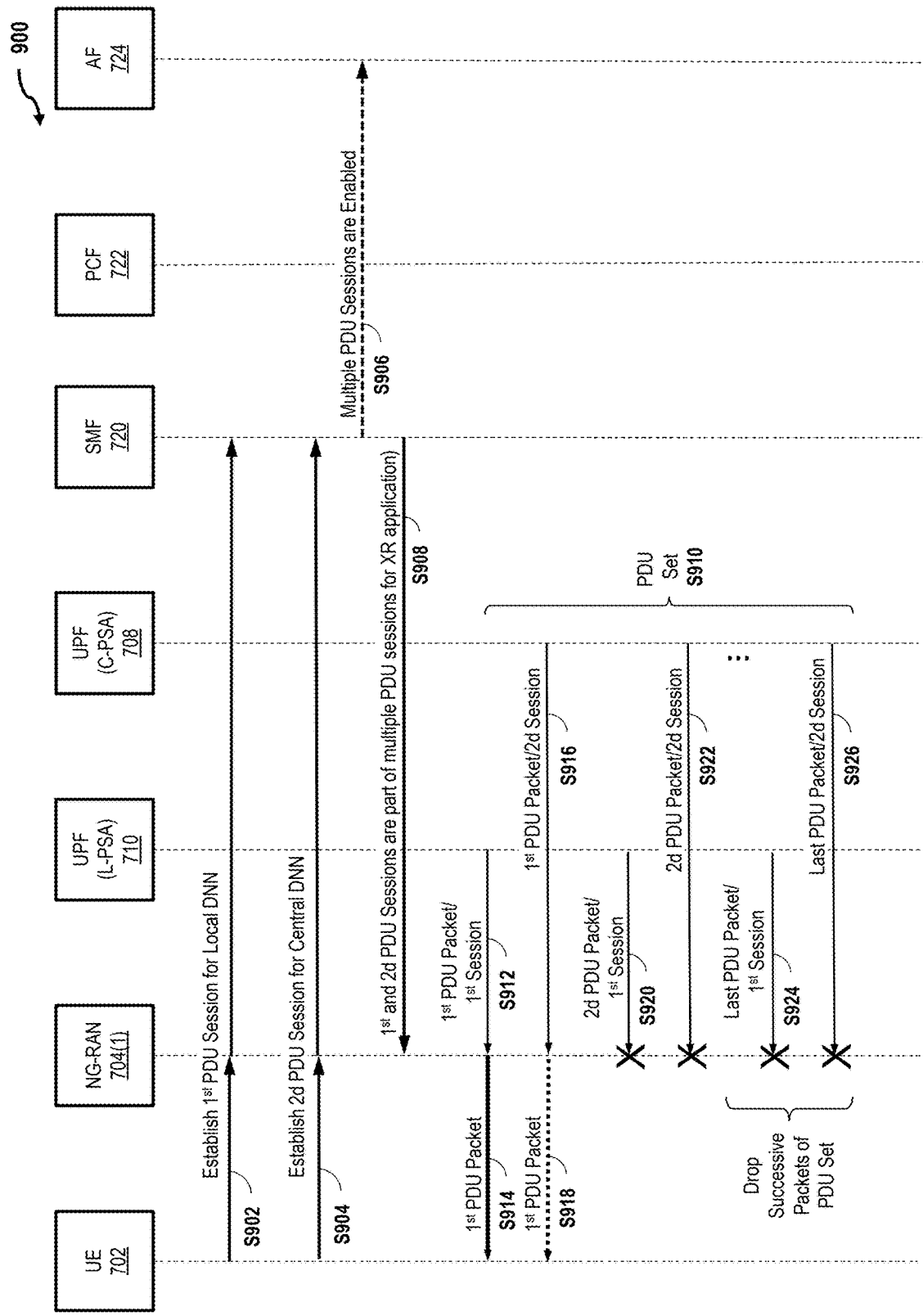
FIG. 9 is a sequence flow diagram depicting an exemplary edge computing implementation, in accordance with an embodiment.

FIG. 9 is a sequence flow diagram depicting an exemplary edge computing implementation 900. In the exemplary embodiment depicted in FIG. 9, process 900 is similar, in some aspects, to process 800, FIG. 8, and is described with respect to exemplary edge computing architecture 700, FIG. 7. The person of ordinary skill in the art will again understand that this architectural implementation is provided by way of example, and is not intended to be limiting. Other multi-access, multi-path, and/or edge computing configurations may be implemented without departing from the scope herein. Accordingly, process 900 may be executed among and with respect to one or more of UE 702 (or a client device), NG-RAN 704(1) (or an access network), UPF 710 (L-PSA), UPF 708 (C-PSA), SMF 720, PCF 722, and AF 724. Unless described below to the contrary, one or more of the several steps, subprocesses, and/or subroutines of process 900 may be performed in a different order, and/or two or more of the several steps, subprocesses, and/or subroutines may be performed simultaneously.

In exemplary operation, process 900 begins at step S902, in which UE 702 establishes a first PDU session, through NG-RAN 704(1), with SMF 720 for a local DNN (e.g., local part of DN 714, FIG. 7). In step S904, UE 702 similarly establishes a second PDU session with SMF 720 through NG-RAN 704(1), but for a central DNN (e.g., central DN 712, FIG. 7). The person of ordinary skill in the art will understand that the first and second PDU sessions of process 800 may alternatively be established with the opposite DNN, or may established with respect to a non-3GPP access network. In an exemplary embodiment of steps S902 and S904, the first and second PDU sessions may use a same PDU session identifier and/or a same PDU set identifier. For example, the core network (not shown in FIG. 9) may inform/indicate to access network 704(1) that the first PDU session and the second PDU session are for the same XR application.

Step S906 is optional. In step S906, SMF 720 may inform the XR application, e.g., AF 724, that multiple PDU sessions have been enabled. In step S908, SMF 720 indicates to NG-RAN 704(1) that the established first and second PDU sessions are part of multiple PDU sessions for the XR application. In step S910, process 900 enables both L-PSA UPF 710 and C-PSA UPF 708 to send the PDU set through the established first and second PDU sessions, respectively.

In the exemplary embodiment depicted in FIG. 9, in substep S912, L-PSA UPF 710 transmits, in the first PDU session, a first PDU packet of the PDU set to access network/NG-RAN 704(1), which then forwards the first session/first PDU packet to UE 702, in substep S914, for successful reception of the first PDU packet from the first PDU session. In substep S916, C-PSA UPF 708 redundantly transmits, in the second PDU session, the first PDU packet of the PDU set to access network/NG-RAN 704(1), which then optionally forwards the second session/first PDU packet to UE 702, in substep S918, for successful redundant reception of the first PDU packet from the second PDU session. That is, according to process 900, UE 702 is enabled to redundantly receive the first PDU packet by way of two separate PDU sessions of the multiple PDU sessions.

Upon successful receipt, at UE 702, of the first PDU packet of the PDU set, process 900 proceeds to substep S920, in which L-PSA UPF 710 transmits a second PDU packet of the PDU set to access network/NG-RAN 704(1) in the first PDU session. In this exemplary scenario, however, this first PDU session/second PDU packet is dropped at access network 704(1), and is not forwarded to UE 702. In substep S922, C-PSA UPF 708 similarly transmits, in the second PDU session, the second PDU packet of the PDU set to access network/NG-RAN 704(1), which similarly drops the second PDU packet before sending this second PDU session/second PDU packet to UE 702.

Thus, according to this exemplary embodiment, even in the case of redundancy over multiple PDU sessions, the system of process 900 may be further configured such that, once a particular PDU packet of the PDU set is dropped from both (or all, in the case of redundancies greater than one) established PDU sessions, all remaining packets of the PDU set up to the last PDU packet thereof may be similarly dropped, in light of the fact that UE 702 will be unable to decode the entire PDU set (e.g., from at least the loss of the second PDU packet over all established PDU sessions).

Accordingly, in step S924, L-PSA UPF 710 transmits a last PDU packet of the PDU set to access network/NG-RAN 704(1) in the first PDU session, and in step S926, C-PSA UPF 708 similarly transmits, in the second PDU session, the last PDU packet of the PDU set to access network/NG-RAN 704(1). However, for both established PDU sessions, access network/NG-RAN 704(1) will drop the last PDU packet (as well as all additional PDU packets of the PDU set after the second PDU packet and prior to the last PDU packet) based on the complete failure/dropping of the second PDU packet of the PDU set. Thus, using this improved redundancy based on multiple PDU sessions, resources may be significantly conserved by avoiding re-transmissions of extraneous PDU packets of a failed PDU set.

The embodiment depicted in FIG. 9 therefore represents an illustrative example implementing an Edge platform. That is, in this example, a wireless device (e.g., UE 702) establishes a first PDU session for a local DNN (e.g., local part of DN 714, handled by L-PSA UPF 710), and a second PDU session for a central DNN (e.g., central DN 712, handled by C-PSA UPF 708) for an XR application. A network function, such as an SMF, UPF, or AMF (e.g., SMF 720, in this example) may then inform (e.g., to AF 724) that the XR application is setup with multiple PDU sessions. The relevant network function (e.g., SMF, UPF, AMF, or AF) may then inform the access network (e.g., NG-RAN 704(1)) that the first and second PDU sessions are for the same XR application.

With knowledge that the first and second PDU sessions belong to the same XR application, NG-RAN 704(1) may be advantageously configured drop subsequent PDU packets of a PDU set only in the case where both of the same PDU packets (e.g., second PDU packets, in this example) from the L-PSA and C-PSA are dropped. Otherwise, NG-RAN 704(1) may be further configured to not drop the PDU set, i.e., in the case where individual PDU packets of the PDU set are not dropped from at least one PDU session or branch of the multiple sessions/branches.

In an exemplary embodiment, one or more of the principles described herein are applicable to may be applied to a variety of session continuity models, including without limitation, SSC modes 1, 2, and/or 3. In an embodiment, in the case of uplink data, the embodiments herein are further applicable for a wireless device or core network configuring, assisting, informing, or indicating to an access network regarding a PDU set handling policy, such as whether to apply a PDU set-based dropping policy.

In an exemplary embodiment, the ATSSS principles described above are further applicable to PDCP duplication, i.e., redundancy at PDCP. For example, a gNB may make a determination to (a) disable a PDU set-based dropping policy (e.g., drop an entire PDU set based on one or more missed PDU packets of the PDU set), or (b) enable a PDU set-based dropping policy based on PDCP duplication being enabled or disabled. In some scenarios, the core network may configure (a) the policy or parameter, and/or (b) the access network to perform the PDU set-based dropping policy. In other scenarios, each PDU set and/or PDU packet may indicate whether to perform the PDU set based-dropping policy based on indication from the core network or DN. In an exemplary embodiment, the gNB is configured to make the determination based on a PDCP duplication configuration. In at least one embodiment, a PDCP layer configures an RLC/MAC to enable or disable the PDU set-based dropping policy In an exemplary embodiment, the PDCP of an access network is configured to determine whether partial or full duplication of packets of a PDU session is enabled. In the case where partial or full PDCP duplication is enabled, the PDCP may be further configured to determine one or more bearers, QoS flows, and/or RLC/MAC sessions enabled with the PDCP duplication, and then may inform whether PDCP duplication is enabled for such bearers and/or a QoS flows, as well as for a PDU set and/or PDU session. In some instances, the PDCP layer is configured to inform whether to enable or disable the PDU set-based dropping policy for the bearer(s), QoS flow(s), PDU set(s), and/or PDU session(s).

In an exemplary embodiment, one or more PDCP configuration parameters includes (a) a list of bearers having an enabled (or disabled) PDU set-based dropping policy, (b) a list of QoS flows having an enabled (or disabled) PDU set-based dropping policy, (c) one or more threshold, priority, or QoS values to enable (or disable) the PDU set-based dropping policy, (d) one or more threshold values of importance (e.g., PDU set importance) to apply the PDU set-based dropping policy, (e) one or more identifiers of wireless devices having an enabled (or disabled) PDU set-based dropping policy, (f) a list of destination and/or source addresses of a PDU session, and/or (g) a list of PDU session identifiers. In at least one embodiment, the PDCP layer is further configured to enable or disable entire PDU sets on the RLC/MAC using, for example, dynamic signaling and/or a PDCP header of a packet.

In an exemplary embodiment, one or more of the dynamic processes described herein may further implement ATSSS feedback and/or ATSSS adaptation. For example, in the case where an NG-RAN, base station, DU, CU, or access network supports an XR application, the respective supporting entity may then inform of or indicate relevant congestion level, latency, and/or jitter statistics on a PDU session and/or a QoS flow for the XR application. In this example, the supporting entity is aware of the PDU session based on an MA-PDU session.

In operation, to facilitate or expedite an ATSSS policy (e.g., switching, steering, splitting, repetition, etc.) for the XR application, the access network (or a network function of the core network) may initiate a performance measurement procedure on one or more access networks in response to an indicated congestion level, latency, or jitter. For example, in the case where a congestion level becomes high (i.e., congested) or exceeds a predetermined value or threshold, the access network or network function will initiate the performance measurement on one or more access networks of the MA-PDU session, including the initiating access network itself, and the MA-PDU session may include a plurality of PDU sessions over the multiple access networks.

In an embodiment, a non-3GPP access node of an access network may not provide statistics of a PDU session or a QoS flow, whereas a 3GPP access node may provide such statistics of a PDU session. Using these statistics, performance measurements may then be initiated by the 3GPP access node, or alternatively by the core network, an XR client, an XR server, and/or a network function of the core network (e.g., SMF, UPF, AMF, PSA, etc.). The SMF (e.g., SMF 720, FIG. 7) may then apply an ATSSS switching policy, including without limitation, (a) switching to a more optimal access network, (b) splitting based on split portions, (c) implementing repetition, (d) applying PDU sets, based on PDU set importance, across the one or more access networks, and/or (e) load balancing based on load information of one or more access networks. In some embodiments, the ATSSS switching policy may be applied by a different network function, such as a UPF and/or a PSA.

In an embodiment, a network function of the core network is aware that an XR client or wireless device is connected to the core network, and a first PDU session of an XR application may thus be established through a particular access network of the plurality of access networks, from which access network statistics of congestion level, jitter, and/or the latency may then be obtained regarding the first PDU session, and/or one or more QoS flows related to the first PDU session. From these obtained statistics of the access network, the network function may then initiate one or more performance measurements over one or more access networks, including the particular access network from which the statistics are obtained. Based on the initiated performance measurement(s), the network function (or a different) network function of may make a determination to switch a PDU session for the XR application from the first particular access network to a different second access network.

In an embodiment, the core network may be further configured to indicate one or more of (a) a PDU session reestablishment or reestablishment procedure by way of the second access network, (b) an update to the first PDU session by way of the second access network, or (c) a handover of the PDU session from the first access network to the second access network. In at least one embodiment, the core network may be further configured to de-establish the first PDU session through the first access network. In an alternative embodiment, the core network may be configured to maintain two such PDU sessions through both of the first and second access networks, respectively. In some embodiments, the core network may be still further configured to initiate: (a) ATSSS functionality; (b) PDCP duplication over the first access network and the second access network; and/or (c) packet duplication over the first access network and the second access network.

Figure 10:
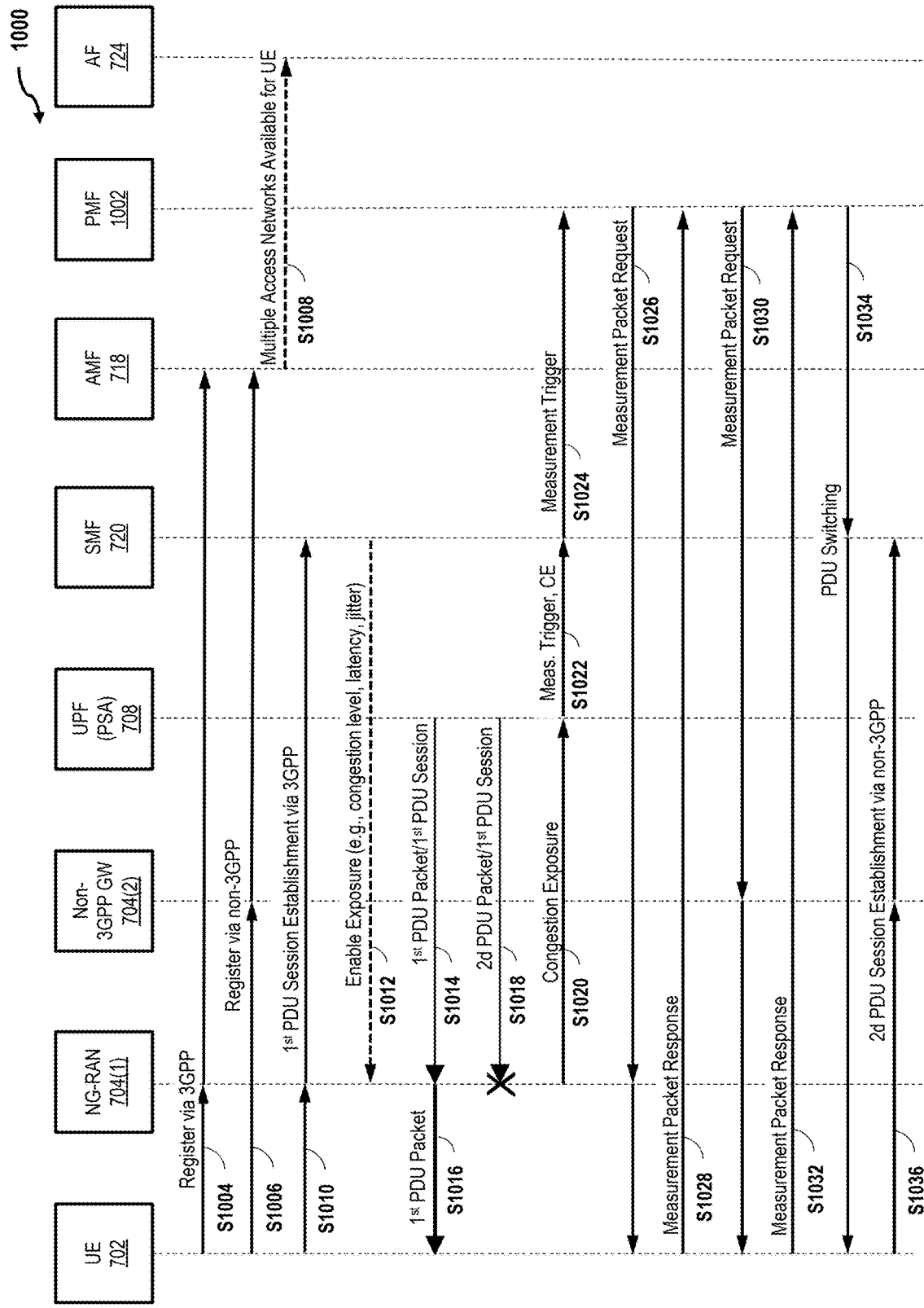
FIG. 10 is a sequence flow diagram depicting an exemplary triggered measurement implementation, in accordance with an embodiment.

FIG. 10 is a sequence flow diagram depicting an exemplary triggered measurement implementation 1000. In the exemplary embodiment depicted in FIG. 10, process 1000 is similar, in some aspects, to processes 800, FIG. 8, and 900, FIG. 9, and is also described with respect to exemplary edge computing architecture 700, FIG. 7. The person of ordinary skill in the art will again understand that this architectural implementation is provided by way of example, and is not intended to be limiting. Other multi-access, multi-path, and/or edge computing configurations may be implemented without departing from the scope herein.

Accordingly, process 1000 may be executed among and with respect to one or more of UE 702 (or a client device), NG-RAN 704(1) (or a first access network), non-3GPP GW 704(2) (or a second access network), UPF 708 (PSA), SMF 720, AMF 722, AF 724, and at least one additional performance measurement function (PMF) 1002, described further below. Unless described below to the contrary, one or more of the several steps, subprocesses, and/or subroutines of process 1000 may be performed in a different order, and/or two or more of the several steps, subprocesses, and/or subroutines may be performed simultaneously.

In exemplary operation, process 1000 begins at step S1004, in which UE 702 registers (e.g., for a PLMN) with AMF 718 through NG-RAN 704(1), i.e., a 3GPP access network of multiple access networks available for an XR application. In step S1006, UE 702 registers with AMF 718 through non-3GPP GW 704(2), i.e., a non-3GPP access network. The person of ordinary skill in the art will understand that the depiction of the first and second access networks as 3GPP and non-3GPP, respectively, is for purposes of illustration, and is not intended to be limiting.

Step S1008 is optional. In step S1008, AMF 718 may inform the XR application, e.g., AF 724, that multiple access networks are available for UE 702. In step S1010, UE 702 establishes a first PDU session with SMF 720 through one of first and second access networks 704(1), 704(2). In the exemplary embodiment depicted in FIG. 10, the first PDU session is established through NG-RAN 704(1) for 3GPP access. Step 1012 is optional. In step S1012, SMF 720 may enable exposure of NG-RAN 704(1) to such statistics as congestion level, latency, and/or jitter.

In step S1014, UPF 708 transmits a first PDU packet for the first PDU session to first access network/NG-RAN 704(1), which then forwards, in step S1016, the first PDU packet to UE 702 for successful reception over the 3GPP access path. In step S1018, UPF 708 transmits a second PDU packet for the first PDU session over the same 3GPP access path to NG-RAN 704(1), which, in this example, is dropped without forwarding to UE 702 (e.g., based on a congestion determination). In step S1020, NG-RAN 704(1) indicates a congestion exposure to UPF 708, which, in step S1022, forwards the congestion exposure to SMF 720 along with a measurement trigger. In step S1024, SMF 720 forwards the measurement trigger to PMF 1002.

In step S1026, PMF 1002 sends a first measurement packet request to UE 702 through NG-RAN 704(1), and in step S1028, UE 702 provides PMF 1002 a first measurement packet response to the first measurement packet request, including at least one performance measurement for the 3GPP access path. In step S1030, PMF 1002 then sends a second measurement packet request to UE 702, but through non-3GPP 704(2). In step S1032, UE 702 provides PMF 1002 a second measurement packet response to the second measurement packet request, including at least one performance measurement regarding the non-3GPP access path. In step S1034, based on the received first and second measurement packet responses, PMF 1002 determines that the non-3GPP access path is more optimal, and indicates to SMF 720 to initiate a PDU switching procedure for UE 702. In step S1036, based on the PDU switching procedure from step S1034, UE 702 establishes a second PDU session with SMF 720 through second access network/non-3GPP 704(2).

Process 1000 thus illustrates an exemplary embodiment where a performance measurement may be triggered for multiple access networks based on at least one exposure from an access network (a 3GPP access network, in this example) for an XR application. In the exemplary embodiment, the access network exposure-based triggered measurement(s) may be advantageously implemented without having to first enable ATSSS or an edge computing procedure.

That is, in the exemplary embodiment depicted in FIG. 10, a wireless device (e.g., UE 702) registers for a PLMN through both of a 3GPP access network (e.g., step S1004) and a non-3GPP access network (e.g., step S1006). A core network of the PLMN may then learn that the wireless device supports multiple access networks either (a) directly from the registering network function (e.g., AMF 718) based on an explicit indication from the wireless device provided in a registration request message, or (b) indirectly upon establishment of the first PDU session for the client device. In an embodiment, a registration request message from the wireless device (e.g., steps S1004, S1006) may be advantageously configured to add a new parameter, such as a flag, indicating multi-access network capability or availability. Alternatively, a similar capability/availability flag may be added in a PDU session establishment message (e.g., steps S1010).

Upon learning of the multi-access network capability/availability of the wireless device, a relevant network function of the core network may expose such information to the application (e.g., AF 724) such that the application may set a policy accordingly. In the exemplary embodiment depicted in FIG. 10, the relevant network function is illustrated, by way of example, as SMF 720. The person of ordinary skill in the art though, will understand that the exposure may alternatively be provided from a different network function (e.g., AMF 718, UPF 708, etc.) without departing from the scope herein. Accordingly, in the exemplary embodiment, the UE 702 establishes (e.g., step S1010) a first PDU session through the 3GPP access network (e.g., NG-RAN 704(2)), which is thus enabled with such exposure statistics as congestion level, latency, and/or jitter information. In an exemplary embodiment, the core network may explicitly (e.g., optional step S1012) or implicitly enable the exposure of the 3GPP access based on one or more of (a) explicit signaling, (b) the XR application type, (c) L4S enablement, (d) PDU set enablement, and (e) XR feature enablement.

As depicted in FIG. 10, once the 3GPP access network (e.g., NG-RAN 704(1)) determines a congestion (e.g., step S1018), the relevant PDU packet (the second PDU packet of the first PDU session, in this example) may be dropped, and the 3GPP access network may then expose the congestion to a relevant network function (e.g., UPF 708, SMF, AMF, etc.). In the exemplary embodiment depicted in FIG. 10, 3GPP NG-RAN 704(1) is illustrated to expose the congestion (e.g., step 1020) to UPF 708. The network function receiving such the congestion exposure (UPF 708, in this example) from the 3GPP access network may then inform another network function (SMF 720, in this example) to initiate a measurement trigger for the performance measurement. In this example, SMF 720 is illustrated to trigger the measurement through PMF 1002.

In an exemplary embodiment, PMF 1002 is advantageously configured to trigger performance measurements through either or both of the 3GPP access network (e.g., NG-RAN 704(1)) and/or the non-3GPP access network (e.g., non-3GPP GW 704(2)), that is, one or more access networks available to the wireless device, which the wireless device is capable of using. Based on the received performance measurements (e.g., steps S1028, S1032), the relevant network function (SMF 720, in this example) is enabled to make a determination (e.g., step S1034) to switch a PDU session from the first access network to a different access network (e.g., from 3GPP NG-RAN 704(1) to non-3GPP GW 704(2), in this example. The person of ordinary skill in the art will understand though, that such PDU switching may occur between a less optimal network and a more optimal network, irrespective of the specific access type, without departing from the scope herein. In some embodiments, the relevant network function making the switching determination may alternatively be a PCF (e.g., PCF 722, FIG. 7).

Accordingly, in an exemplary embodiment, once an MA-PDU session is established, performance measurements may be triggered and analyzed to determine optimal switching, splitting, and/or replication of the PDU packets of the MA-PDU session among the various access networks available to a client device for the MA-PDU session. Such determinations may be executed by a relevant network function, such as an SMF, which may then initiate a switching of an established first PDU session from a first access network to a different second access network. Once such switching is initiated, the wireless device may re-establish the first PDU session on the second access network and release or remove the first PDU session from the first access network. Alternatively, the wireless device may establish a second PDU session on the second access network and maintain the first PDU session on the first access network.

In an exemplary embodiment, one or more of SSC mode 1, mode 2, or mode 3 may be implemented for switching a PDU session. In at least one embodiment, PDU session switching may additionally or alternatively utilize make-before-break procedures and/or ATSSS-based MA-PDU session setup. In some embodiments, the relevant network functions of the core network expose to an AF at least one PDU session type of the XR application to an application function, including without limitation, (a) an MA-PDU type, (b) a session breakout type, (c) multiple PDU sessions, and/or (d) an SSC mode of the XR application PDU session(s).

Exemplary embodiments of PDU systems and methods for PDU set handling and extended reality application support are described above in detail. The several examples above are described with respect to dual connectivity/DualQ and L4S functionality, but the person of ordinary skill in the art will understand that the principles herein are not exclusive of such conventional technologies or other developing standards. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of forwarding a congestion indication for a data network including a 3GPP access portion and a non-3GPP access portion, the method comprising:
   receiving, from the 3GPP access portion, by a non-3GPP gateway function of the non-3GPP access portion, a first protocol data unit (PDU) packet including a first internet protocol (IP) header, wherein the first PDU packet is an eXtended Reality (XR) PDU packet of an XR application enabling congestion tagging at an access node of the data network;
   determining, from a first field of the first IP header, a congestion marking for the XR PDU packet;
   generating, a second IP header for the first PDU packet;
   copying, based on the determined congestion marking, a value of the first field from the first IP header into a second field the second IP header;
   adding the second IP header to the first PDU packet; and
   transmitting, from the non-3GPP access portion to the data network, the first PDU packet including the first IP header and the second IP header.

2. The method of claim 1, wherein the determined congestion marking indicates support for a low latency low loss scalable throughput (L4S) standard, and further comprising notifying that L4S is enabled prior to copying the value of the first field.

3. The method of claim 2, wherein the first field of the first IP header comprises a first explicit congestion notification (ECN) field, wherein the second field of the second IP header comprises a second ECN field, and wherein the first ECN field equals the second ECN field.

4. The method of claim 3, wherein the first ECN field includes an ECN-capable transport (ECT) congestion flag indicating no ECT, ECT(0), ECT(1), or congestion experienced.

5. The method of claim 2, wherein the determined congestion marking includes a value of at least one of 00, 01, 10, and 11.

6. The method of claim 1, further comprising encrypting, by the non-3GPP access portion, the first PDU packet and the first IP header prior to the step of adding the second IP header to the first PDU packet.

7. The method of claim 1, wherein the first PDU packet includes a PDU payload, wherein the second IP header is an outer IP header, and wherein the first IP header is an inner IP header logically disposed between the PDU payload and the outer IP header.

8. The method of claim 1, wherein the non-3GPP gateway function includes at least one of a trusted access means and an untrusted access means.

9. The method of claim 8, wherein the trusted access means includes trusted non-3GPP gateway function (TNGF) for non-3GPP access.

10. The method of claim 8, wherein the untrusted access means includes at least one of a non-3GPP interworking function (N3IWF) and a wireline access.

11. The method of claim 1, wherein the first PDU packet is a downlink PDU packet.

12. The method of claim 11, further comprising receiving, by a wireless electronic device, the transmitted first PDU packet including the first IP header and the second IP header.

13. The method of claim 12, further comprising generating, from the wireless electronic device, an uplink second PDU packet.

14. The method of claim 13, further comprising copying, by the wireless electronic device, an explicit congestion notification (ECN) field from the second IP header of the downlink first PDU packet into a third IP header of the uplink second PDU packet.

15. A method of exposing a congestion level for a non-3GPP access network of a communication system including a 3GPP access network, comprising:

receiving, by user plane function (UPF) of the 3GPP access network of the communication system, a first protocol data unit (PDU) packet including a first internet protocol (IP) IP header, wherein the first PDU packet is an eXtended Reality (XR) PDU packet of an XR application enabling congestion tagging by the UPF;

detecting from an explicit congestion notification (ECN) field of the first IP header, the congestion level for the first PDU packet;

determining a non-3GPP access destination for the first PDU packet;

establishing the UPF as a PDU session anchor for switching from the 3GPP access network to the non-3GPP access network; and transmitting the first PDU packet to the non-3GPP access destination including the ECN field of the first IP header.

16. The method of claim 15, wherein the ECN field includes a first value.

17. The method of claim 16, wherein the first value is 10.

18. The method of claim 15, wherein the first IP header comprises a most outer IP header of the first PDU packet.

19. The method of claim 15, wherein the non-3GPP access destination includes at least one of a wireline access, a wireless local area network (WLAN), a non-3GPP interworking function (N3IWF), a trusted non-3GPP gateway function (TNGF) for non-3GPP access, and an access gateway function (AGF).

20. The method of claim 15, wherein the UPF supports at least one 3GPP protocol enabling congestion exposure.

* * * * *